(12) United States Patent
Byers et al.

(10) Patent No.: US 7,800,019 B2
(45) Date of Patent: Sep. 21, 2010

(54) MIRROR ASSEMBLY WITH HEATER ELEMENT

(75) Inventors: Donald C. Byers, Marne, MI (US); Hamid Habibi, Holland, MI (US); Niall R. Lynam, Holland, MI (US); Ian A. McCabe, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 12/578,729

(22) Filed: Oct. 14, 2009

(65) Prior Publication Data

US 2010/0038352 A1 Feb. 18, 2010

Related U.S. Application Data

(60) Continuation of application No. 12/170,867, filed on Jul. 10, 2008, now Pat. No. 7,605,348, which is a division of application No. 11/334,139, filed on Jan. 18, 2006, now Pat. No. 7,400,435.

(60) Provisional application No. 60/644,903, filed on Jan. 19, 2005, provisional application No. 60/667,049, filed on Mar. 31, 2005.

(51) Int. Cl.
    H05B 1/00 (2006.01)
    H05B 3/00 (2006.01)
    H05B 11/00 (2006.01)

(52) U.S. Cl. .................................. 219/219; 359/883

(58) Field of Classification Search ................ 359/871, 359/872, 883; 219/219
    See application file for complete search history.

(56) References Cited

U.S. PATENT DOCUMENTS

| 2,263,382 A | 11/1941 | Gotzinger |
| 2,580,014 A | 12/1951 | Gazda |
| 3,266,016 A | 8/1966 | Maruyama et al. |
| 3,280,701 A | 10/1966 | Donnelly et al. |
| 4,435,042 A | 3/1984 | Wood et al. |

(Continued)

FOREIGN PATENT DOCUMENTS

| EP | 0356099 A2 | 2/1990 |
| JP | 362075619 A | 4/1987 |

*Primary Examiner*—Alessandro Amari
(74) *Attorney, Agent, or Firm*—Van Dyke, Gardner, Linn & Burkhart, LLP

(57) ABSTRACT

A mirror reflective element system has a front substrate having a first surface and a second surface, the second surface having a transparent second surface electrically conductive coating disposed thereon, and a rear substrate that has a third surface and a fourth surface, the third surface having a third surface electrically conductive coating disposed thereon. An attaching surface of a heating element is attached at the fourth surface. The heating element has an electrically conductive heating element established thereat and includes first and second electrically conductive traces. The electrically conductive heating element and the first and second electrically conductive traces are electrically isolated from one another. The first electrically conductive trace provides, at least in part, an electrically conductive connection to the transparent second surface electrically conductive coating, and the second electrically conductive trace provides, at least in part, an electrically conductive connection to the third surface electrically conductive coating.

21 Claims, 7 Drawing Sheets

U.S. PATENT DOCUMENTS

| | | |
|---|---|---|
| 4,436,371 A | 3/1984 | Wood et al. |
| 4,499,451 A | 2/1985 | Suzuki et al. |
| 4,588,267 A | 5/1986 | Pastore |
| 4,623,222 A | 11/1986 | Itoh et al. |
| 4,630,904 A | 12/1986 | Pastore |
| 4,679,906 A | 7/1987 | Brandenburg |
| 4,712,879 A | 12/1987 | Lynam et al. |
| 4,721,364 A | 1/1988 | Itoh et al. |
| 4,773,740 A | 9/1988 | Kawakami et al. |
| 4,793,690 A | 12/1988 | Gahan et al. |
| 4,799,768 A | 1/1989 | Gahan |
| 4,826,289 A | 5/1989 | Vandenbrink et al. |
| 4,827,086 A | 5/1989 | Rockwell |
| 4,855,550 A | 8/1989 | Schultz, Jr. |
| 4,859,813 A | 8/1989 | Rockwell |
| 4,882,466 A | 11/1989 | Friel |
| 4,882,565 A | 11/1989 | Gallmeyer |
| 4,906,085 A | 3/1990 | Sugihara et al. |
| 4,948,242 A | 8/1990 | Desmond et al. |
| 5,014,167 A | 5/1991 | Roberts |
| 5,066,112 A | 11/1991 | Lynam et al. |
| 5,073,012 A | 12/1991 | Lynam |
| 5,076,673 A | 12/1991 | Lynam et al. |
| 5,078,480 A | 1/1992 | Warszawski |
| 5,115,346 A | 5/1992 | Lynam |
| 5,117,346 A | 5/1992 | Gard |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,151,824 A | 9/1992 | O'Farrell |
| 5,178,448 A | 1/1993 | Adams et al. |
| 5,179,471 A | 1/1993 | Caskey et al. |
| 5,183,099 A | 2/1993 | Bechu |
| 5,189,537 A | 2/1993 | O'Farrell |
| 5,193,029 A | 3/1993 | Schofield et al. |
| 5,207,492 A | 5/1993 | Roberts |
| 5,233,461 A | 8/1993 | Dornan et al. |
| 5,253,109 A | 10/1993 | O'Farrell et al. |
| 5,285,060 A | 2/1994 | Larson et al. |
| 5,313,335 A | 5/1994 | Gray et al. |
| 5,327,288 A | 7/1994 | Wellington et al. |
| 5,354,965 A | 10/1994 | Lee |
| 5,355,245 A | 10/1994 | Lynam |
| 5,406,414 A | 4/1995 | O'Farrell et al. |
| 5,437,931 A | 8/1995 | Tsai et al. |
| 5,446,576 A | 8/1995 | Lynam et al. |
| 5,481,409 A | 1/1996 | Roberts |
| 5,509,606 A | 4/1996 | Breithaupt et al. |
| 5,523,877 A | 6/1996 | Lynam |
| 5,525,264 A | 6/1996 | Cronin et al. |
| 5,535,056 A | 7/1996 | Caskey et al. |
| 5,550,677 A | 8/1996 | Schofield et al. |
| 5,567,360 A | 10/1996 | Varaprasad et al. |
| 5,575,552 A | 11/1996 | Faloon et al. |
| 5,587,236 A | 12/1996 | Agrawal et al. |
| 5,587,699 A | 12/1996 | Faloon et al. |
| 5,594,222 A | 1/1997 | Caldwell |
| 5,607,538 A | 3/1997 | Cooke |
| 5,610,380 A | 3/1997 | Nicolaisen |
| 5,610,756 A | 3/1997 | Lynam et al. |
| 5,649,756 A | 7/1997 | Adams et al. |
| 5,668,663 A | 9/1997 | Varaprasad et al. |
| 5,669,698 A | 9/1997 | Veldman et al. |
| 5,689,370 A | 11/1997 | Tonar et al. |
| 5,724,187 A | 3/1998 | Varaprasad et al. |
| 5,751,489 A | 5/1998 | Caskey et al. |
| 5,788,357 A | 8/1998 | Muth et al. |
| 5,790,298 A | 8/1998 | Tonar |
| 5,808,777 A | 9/1998 | Lynam et al. |
| 5,877,897 A | 3/1999 | Schofield et al. |
| 5,910,854 A | 6/1999 | Varaprasad et al. |
| 5,922,176 A | 7/1999 | Caskey |
| 5,938,320 A | 8/1999 | Crandall |
| 6,001,486 A | 12/1999 | Varaprasad et al. |
| 6,002,544 A | 12/1999 | Yatsu |
| 6,005,724 A | 12/1999 | Todd |
| 6,065,840 A | 5/2000 | Caskey et al. |
| 6,111,684 A | 8/2000 | Forgette et al. |
| 6,154,306 A | 11/2000 | Varaprasad et al. |
| 6,164,564 A | 12/2000 | Franco et al. |
| 6,172,613 B1 | 1/2001 | DeLine et al. |
| 6,178,034 B1 | 1/2001 | Allemand et al. |
| 6,196,688 B1 | 3/2001 | Caskey et al. |
| 6,207,083 B1 | 3/2001 | Varaprasad et al. |
| 6,245,262 B1 | 6/2001 | Varaprasad et al. |
| 6,257,746 B1 | 7/2001 | Todd et al. |
| 6,260,608 B1 | 7/2001 | Kim |
| 6,286,965 B1 | 9/2001 | Caskey et al. |
| 6,310,611 B1 | 10/2001 | Caldwell |
| 6,318,870 B1 | 11/2001 | Spooner et al. |
| 6,320,282 B1 | 11/2001 | Caldwell |
| 6,329,925 B1 | 12/2001 | Skiver et al. |
| 6,356,376 B1 | 3/2002 | Tonar et al. |
| 6,420,036 B1 | 7/2002 | Varaprasad et al. |
| 6,428,172 B1 | 8/2002 | Hutzel et al. |
| 6,441,964 B1 | 8/2002 | Chu et al. |
| 6,449,082 B1 | 9/2002 | Agrawal et al. |
| 6,501,387 B2 | 12/2002 | Skiver et al. |
| 6,512,203 B2 | 1/2003 | Jones et al. |
| 6,512,624 B2 | 1/2003 | Tonar et al. |
| 6,595,649 B2 | 7/2003 | Hoekstra et al. |
| 6,615,438 B1 | 9/2003 | Franco et al. |
| 6,627,918 B2 | 9/2003 | Getz et al. |
| 6,642,851 B2 | 11/2003 | DeLine et al. |
| 6,648,477 B2 | 11/2003 | Hutzel et al. |
| 6,669,109 B2 | 12/2003 | Ivanov et al. |
| 6,690,268 B2 | 2/2004 | Schofield et al. |
| 6,717,109 B1 | 4/2004 | Macher et al. |
| 6,719,215 B2 | 4/2004 | Drouillard |
| 6,737,629 B2 | 5/2004 | Nixon et al. |
| 6,742,904 B2 | 6/2004 | Bechtel et al. |
| D493,131 S | 7/2004 | Lawlor et al. |
| D493,394 S | 7/2004 | Lawlor et al. |
| 6,824,281 B2 | 11/2004 | Schofield et al. |
| 6,831,268 B2 | 12/2004 | Bechtel et al. |
| 6,834,969 B2 | 12/2004 | Bade et al. |
| 7,004,592 B2 | 2/2006 | Varaprasad et al. |
| 7,004,593 B2 | 2/2006 | Weller et al. |
| 7,042,616 B2 | 5/2006 | Tonar et al. |
| 7,106,392 B2 | 9/2006 | You |
| 7,184,190 B2 | 2/2007 | McCabe et al. |
| 7,244,912 B1 | 7/2007 | Rawlings |
| 7,287,868 B2 | 10/2007 | Carter et al. |
| 7,400,435 B2 | 7/2008 | Byers et al. |
| 7,605,348 B2 | 10/2009 | Byers et al. |
| 2002/0036828 A1 | 3/2002 | Wong |
| 2002/0126054 A1* | 9/2002 | Fuerst et al. ............. 343/712 |
| 2002/0154379 A1 | 10/2002 | Tonar et al. |
| 2002/0159270 A1 | 10/2002 | Lynam et al. |
| 2003/0043589 A1 | 3/2003 | Blank |
| 2003/0101749 A1 | 6/2003 | Lingle et al. |
| 2004/0032638 A1 | 2/2004 | Tonar et al. |
| 2004/0032676 A1 | 2/2004 | Drummond et al. |
| 2004/0165248 A1 | 8/2004 | Tonar |
| 2004/0264011 A1 | 12/2004 | Lynam |
| 2005/0078389 A1 | 4/2005 | Kulas et al. |
| 2005/0083577 A1 | 4/2005 | Varaprasad et al. |
| 2005/0099693 A1 | 5/2005 | Schofield et al. |
| 2005/0134983 A1 | 6/2005 | Lynam |
| 2005/0195488 A1 | 9/2005 | McCabe et al. |
| 2006/0050018 A1 | 3/2006 | Hutzel et al. |
| 2006/0050356 A1 | 3/2006 | Varaprasad et al. |
| 2006/0061008 A1 | 3/2006 | Karner et al. |
| 2006/0098289 A1 | 5/2006 | McCabe et al. |

| | | | | | | |
|---|---|---|---|---|---|---|
| 2006/0126150 A1 | 6/2006 | Tonar et al. | 2009/0207514 A1 * | 8/2009 | McCabe et al. | 359/871 |
| 2006/0164230 A1 | 7/2006 | DeWind et al. | | | | |
| 2006/0255960 A1 | 11/2006 | Uken et al. | * cited by examiner | | | |

…

MIRROR ASSEMBLY WITH HEATER ELEMENT

CROSS REFERENCE TO RELATED APPLICATIONS

The present application is a continuation of U.S. patent application Ser. No. 12/170,867, filed Jul. 10, 2008, now U.S. Pat. No. 7,605,348, which is a division of U.S. patent application Ser. No. 11/334,139, filed Jan. 18, 2006, now U.S. Pat. No. 7,400,435, which claims benefit of U.S. provisional applications, Ser. No. 60/644,903, filed Jan. 19, 2005; and Ser. No. 60/667,049, filed Mar. 31, 2005, which are hereby incorporated herein by reference in their entireties.

FIELD OF THE INVENTION

The present invention relates generally to reflective element assemblies for rearview mirrors of vehicles and, more particularly, to reflective element assemblies having a heater pad disposed thereon, and a method for manufacturing such reflective element assemblies.

BACKGROUND OF THE INVENTION

It is known to provide a heater pad at a rear surface of a reflective element of an exterior rearview mirror assembly of a vehicle. Such heater pads are typically adhered to the rear surface of the reflective element, such as via double sided adhesive tape of the like. The heater pad includes two conductive traces disposed thereon and often includes electrical connectors or contacts protruding therefrom for electrical connection of the conductive traces to a power source or wiring harness of the mirror assembly. When the connectors are powered, the conductive traces generate heat. Such heater pads are typically applied to the rear surface of the reflective element that is unobstructed by other elements at the rear surface, such that the heater pad may be adhered directly to the rear glass surface of the glass reflective element.

SUMMARY OF THE INVENTION

The present invention provides a reflective element for an exterior rearview mirror assembly of a vehicle that includes a heating element, such as a heater pad or the like, at the rear surface of the reflective element. The reflective element comprises an electro-optic (such as electrochromic) reflective element assembly and preferably includes a front substrate and a rear substrate with an electro-optic medium established therebetween. The rear surface of the front substrate (commonly referred to as the second surface of the reflective element) preferably includes a transparent conductive coating thereon, while the front surface of the rear substrate (commonly referred to as the third surface of the reflective element) includes a metallic conductive coating thereon. The heating element or heater pad is disposed at the rear surface of the rear substrate (commonly referred to as the fourth surface of the reflective element), The heating element or heater pad includes conductors or connectors or terminals that may electrically connect to the second and third surface conductive coatings so that the electrical contacts of the reflective element may be made to the heater pad terminals at the fourth surface of the reflective element. Thus, the present invention utilizes conductive traces and connectors on a heater element or pad as a means of powering the reflective element or cell, while the heater element or pad also includes other electrically conductive elements or traces (which are electrically isolated from the other conductive elements or traces of the heater element or pad) and connectors to power the heater pad and thus generate heat at the rear of the reflective element or cell.

According to an aspect of the present invention, a mirror reflective element system for a variable reflectance vehicular mirror includes a front substrate and a rear substrate. The front substrate has a first surface and a second surface, with the second surface having a transparent second surface electrically conductive coating disposed thereon. The rear substrate has a third surface and a fourth surface, with the third surface having a third surface electrically conductive coating disposed thereon. A fourth surface electrically conductive element is disposed at the fourth surface, and is in conductive continuity with one of the third surface electrically conductive coating and the second surface electrically conductive coating. A heating element is attached to the fourth surface of the rear substrate. The heating element comprises a heating element substrate having an attaching surface for attaching to the fourth surface and a rear surface opposite the attaching surface. The heating element substrate has a first electrically conductive element established thereat. The first conductive element generates heat to heat a portion of the heating element when powered. Typically, when the ignition and/or battery voltage of the vehicle is applied to the heating element/pad, electrical current is conducted through the first conductive/conducting heater element or trace or path and heat is generated due to the power dissipation caused by the ohmic resistance of the conductive element in accordance with the well established formula that power (watts) is equal to the current (amps) multiplied by the square of the electrical resistance (ohms). The heating element includes a second electrically conductive element established thereat. The second conductive element is at least partially established at the attaching surface. The first and second conductive elements are electrically isolated from one another. The second conductive element connects to the fourth surface electrically conductive element at the fourth surface of the rear substrate such that conductive continuity is established between the second electrically conductive element and the fourth surface electrically conductive element when the heating element is attached to the fourth surface. The first and second conductive elements are accessible at the rear surface of the heating element substrate.

The fourth surface conductive element may be in conductive continuity with the third surface electrically conductive coating and another fourth surface conductive element may be in conductive continuity with the second surface electrically conductive coating, in order to energize or power the conductive coatings at both opposed substrate surfaces. The heating element may include a third conductive element that connects to the other fourth surface electrically conductive element at the fourth surface of the rear substrate such that conductive continuity is established between the third electrically conductive element and the other fourth surface electrically conductive element when the heating element is attached to the fourth surface. The third conductive element is electrically isolated from the first and second conductive elements. The heating element may also include another heating conductive element disposed over a portion of the heating element substrate and operable or energizable to generate heat at the substrate.

Thus, the heating element substrate may include a pair of heating elements or traces (such as the first conductive element and the heating conductive element) for generating heat over a substantial area of the heating element or pad, and may include a pair of reflective element powering conductive elements (such as the second and third conductive elements) for energizing or powering the respective conductive coating at the respective one of the second and third surfaces of the reflective element.

The heating element or heater pad may be constructed so as to be a resistive-type heating element or a positive temperature coefficient-type (PTC-type) heating element or automotive mirror heater pad or the like, as are known in the automotive exterior mirror heating arts, without affecting the scope of the present invention.

The conductive elements at the fourth surface of the rear substrate may comprise electrically conductive coatings, such as chromium or the like. Preferably, the third surface conductive coating overlaps an edge portion of the rear substrate, and the first conductive element overlaps the edge portion to establish conductive continuity between the third surface conductive coating and the conductive element at the fourth surface. Conductive continuity may be established between the second conductive element at the fourth surface and the second surface conductive coating via an ultrasonic solder or conductive epoxy or the like.

The reflective element assembly may include a back plate that attaches to the rear surface of the heating element and/or the fourth surface of the rear substrate. The back plate may include openings therethrough that correspond with the electrical connectors when the back plate is attached to the rear surface of the heating element and/or the fourth surface of the rear substrate, such that the electrical connectors are accessible at the back plate.

Therefore, the present invention provides a reflective element assembly that includes a heating element or heater pad attached to a rear or fourth surface of the reflective element. The heating element is attached to the fourth surface in a manner that establishes conductive continuity between connectors or conductive elements at the rear surface of the heating element and the respective conductive coatings on the second and third surfaces of the reflective element when the heating element is attached to the rear or fourth surface of the reflective element. The heating element thus includes conductive elements for generating heat and other conductive elements for powering or energizing respective conductive coatings at the opposed surfaces of the front and rear substrates of the reflective element, with the conductive elements or traces being electrically isolated and separate from one another at the heating element substrate. The present invention thus provides enhanced assembly processes and robust electrical connections between the connectors and the conductive coatings.

These and other objects, advantages, purposes and features of the present invention will become apparent upon review of the following specification in conjunction with the drawings.

DESCRIPTION OF THE PREFERRED EMBODIMENTS

Figure 1:
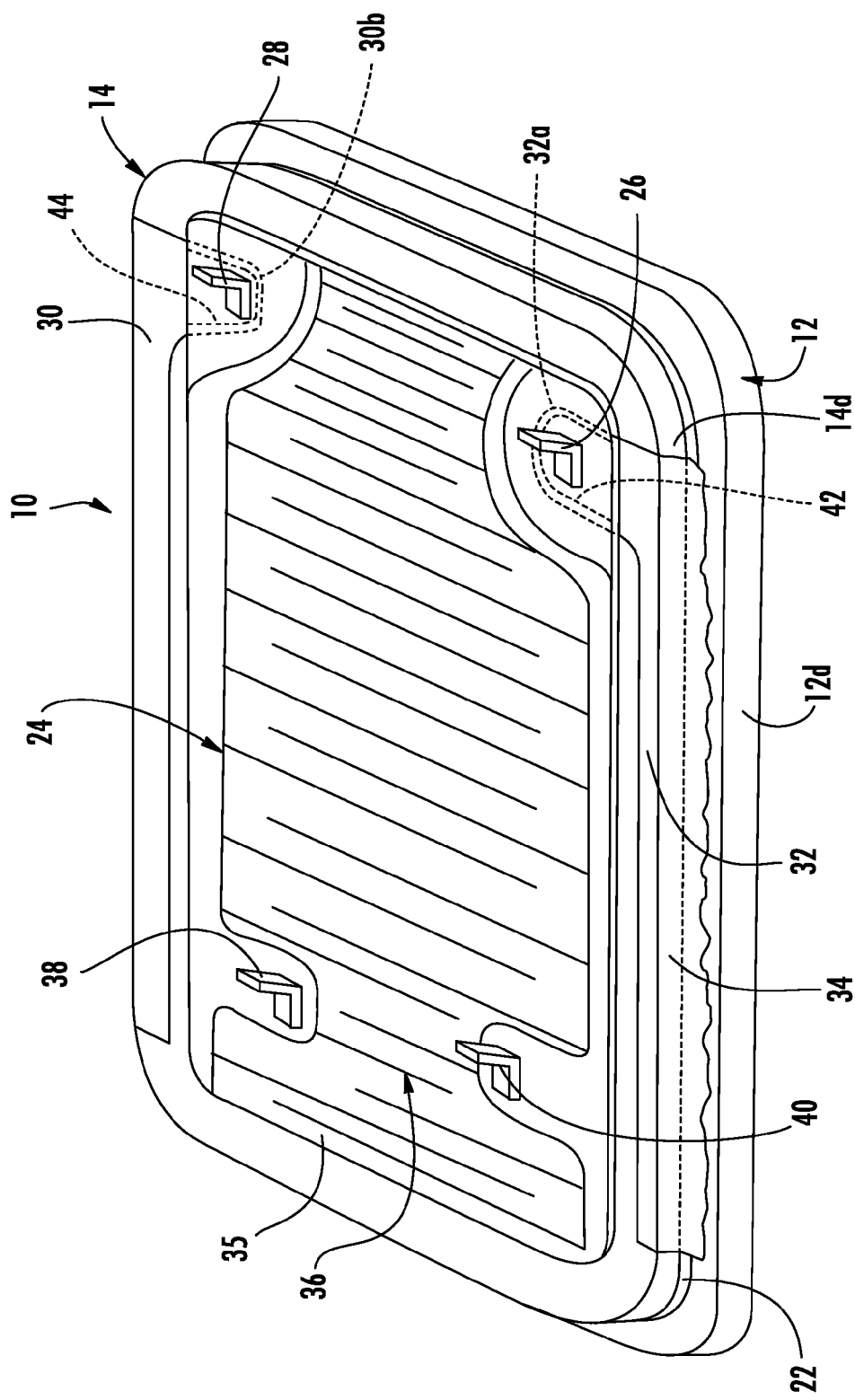
FIG. 1 is a perspective view of a reflective element assembly in accordance with the present invention.
Figure 2:
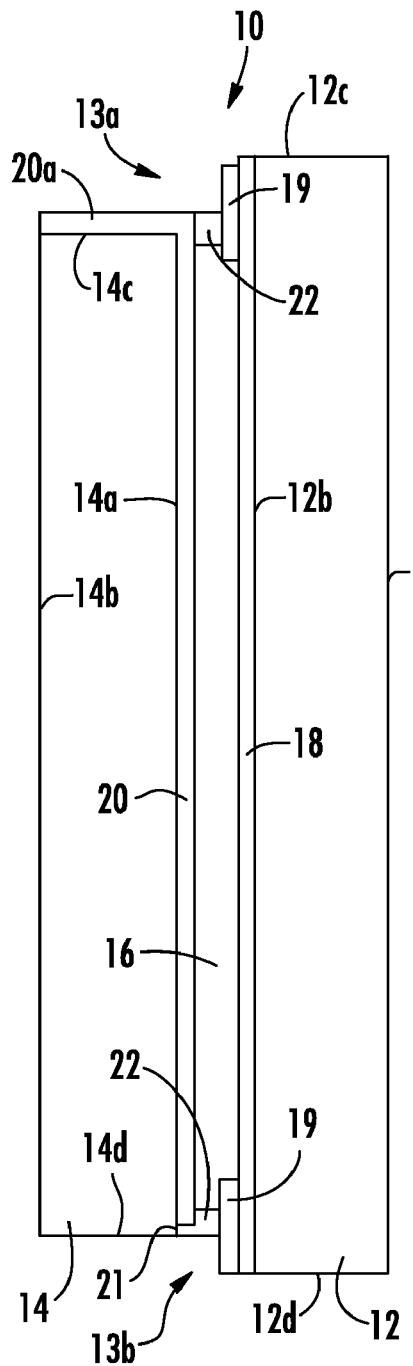
FIG. 2 is a sectional view of the reflective element with the heater pad removed.
Figure 3:
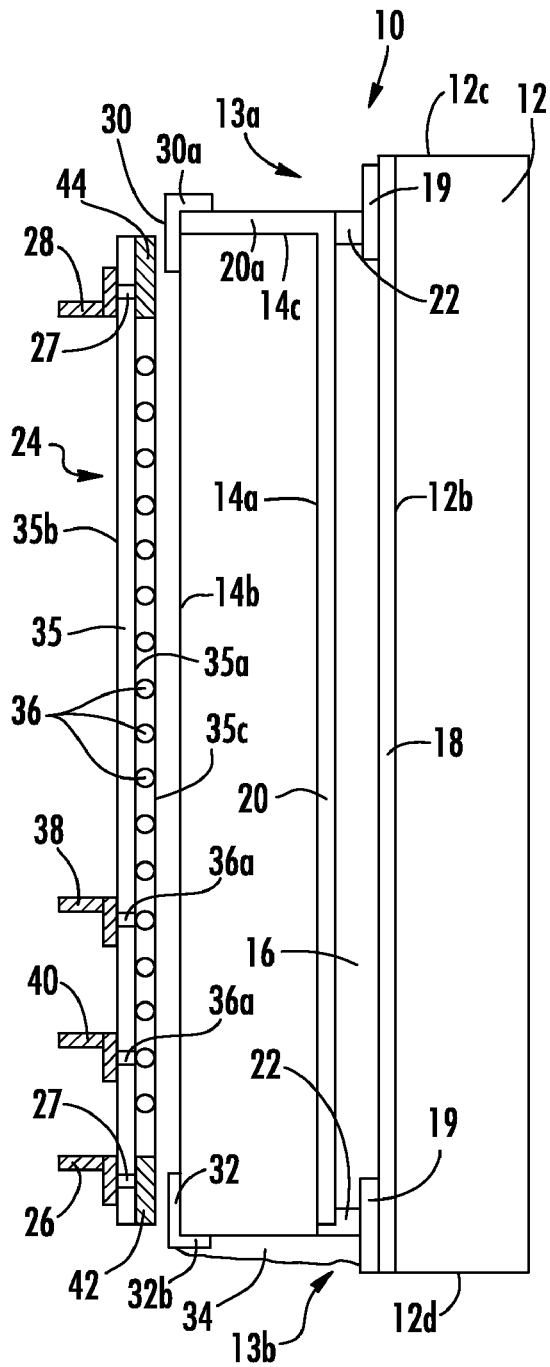
FIG. 3 is a sectional view of the reflective element of FIG. 2, with a heater pad being placed thereon.

Referring now to the drawings and the illustrative embodiments depicted therein, a mirror reflective element or reflective element assembly or cell 10 for an interior or exterior rearview mirror assembly of a vehicle includes a first or front substrate or glass element 12 and a second or rear substrate or glass element 14 (FIGS. 1-3). The rear reflective element substrate 14 is spaced from front reflective element substrate 12, with an electrolyte or monomer composition or electro-optic (such as electrochromic) medium 16 sandwiched between the substrates and between and in contact with respective conductive or semi-conductive layers 18, 20 on the opposed surfaces of the substrates. An epoxy seal material 22 or the like is applied between the substrates to define the cavity for the electro-optic medium and to adhere the substrates together. A heating element, such as a heater pad 24, is applied to or adhered to or attached to a rear surface of the rear substrate and provides electrical connectors 26, 28 that are in electrical or conductive connection with the conductive layers 18, 20, respectively, as discussed below.

The rearview mirror reflective element assembly of the present invention comprises an electro-optic or electrochromic reflective element assembly or cell, such as an electrochromic mirror reflective element assembly with coated substrates, such as by utilizing principles disclosed in commonly assigned U.S. Pat. Nos. 6,690,268; 5,140,455; 5,151,816; 5,151,824; 6,178,034; 6,154,306; 5,567,360; 5,525,264; 5,808,777; 5,610,756; 5,446,576; 5,406,414; 5,253,109; 5,076,673; 5,073,012; 5,724,187; 5,668,663; 5,910,854; 5,142,407; and/or 4,712,879, which are hereby incorporated herein by reference, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lainpert and C. G. Granquist, EDS., Optical Engineering Press, Wash. (1990), which are hereby incorporated by reference herein, and/or in PCT application No. PCT/US03/29776, filed Sep. 19, 2003 by Donnelly Corp. et al. for ELECTROCHROMIC MIRROR ASSEMBLY and/or PCT Application No. PCT/US03/35381, filed Nov. 5, 2003 by Donnelly Corp. et al. for ELECTRO-OPTIC REFLECTIVE ELEMENT ASSEMBLY, and/or U.S. patent application Ser. No. 10/054,633, filed Jan. 22, 2002 by Lynam et al. for VEHICULAR LIGHTING SYSTEM, now U.S. Pat. No. 7,195,381; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 by Hutzel et al. for ACCESSORY SYSTEM FOR VEHICLE; Ser. No. 11/226,628, filed Sep.

14, 2005 by Karner et al.; Ser. No. 10/993,302, filed Nov. 19, 2004, now U.S. Pat. No. 7,338,177; and/or Ser. No. 11/284, 543, filed Nov. 22, 2005; Ser. No. 11/226,628, filed Sep. 14, 2005 by Karner et al.; and/or Ser. No. 11/021,065, filed Dec. 23, 2004 by McCabe et al. for ELECTRO-OPTIC MIRROR CELL, now U.S. Pat. No. 7,255,451; and/or PCT Application No. PCT/US04/43500, filed Dec. 23, 2004 by Donnelly Corp. et al. for ELECTRO-OPTIC MIRROR CELL, and/or U.S. provisional application Ser. No. 60/653,787, filed Feb. 17, 2005, which are all hereby incorporated herein by reference.

The front reflective element substrate 12 of reflective element 10 has a front surface 12a (the first surface of the electrochromic cell) and a rear surface 12b (the second surface of the electrochromic cell). The rear or second surface 12b may include one or more transparent electrically conductive layers 18 (such as an indium tin oxide (ITO) layer, or a doped indium tin oxide layer or any other transparent electrically semi-conductive layer or coating or the like (such as indium cerium oxide (ICO), indium tungsten oxide (IWO), or indium oxide (IO) layers or the like or a zinc oxide layer or coating, or a zinc oxide coating or the like doped with aluminum or other metallic materials, such as silver or gold or the like, or other oxides doped with a suitable metallic material or the like, or such as disclosed in PCT Application No. PCT/US03/29776, filed Sep. 19, 2003 by Donnelly Corp. et al. for ELECTROCHROMIC MIRROR ASSEMBLY and U.S. patent application Ser. No. 10/528,269, filed Mar. 17, 2005, now U.S. Pat. No. 7,274,501, which are hereby incorporated herein by reference) thereon. As shown in FIGS. 2 and 3, the second or rear surface 12b of the front substrate 12 may include a perimeter metallic coating or strip or layer or band 19 around the perimeter regions of the substrate to form a ring or frame around the perimeter of the substrate that is substantially non-transparent or opaque, such as described in PCT Application No. PCT/US03/35381, filed Nov. 5, 2003 by Donnelly Corp. et al. for ELECTRO-OPTIC REFLECTIVE ELEMENT ASSEMBLY, and/or U.S. patent application Ser. No. 10/533,762, filed May 4, 2005, now U.S. Pat. No. 7,184, 190; Ser. No. 11/021,065, filed Dec. 23, 2004 by McCabe et al. for ELECTRO-OPTIC MIRROR CELL, now U.S. Pat. No. 7,255,451; and/or Ser. No. 11/226,628, filed Sep. 14, 2005 by Karner et al.; and/or PCT Application No. PCT/US04/43500, filed Dec. 23, 2004 by Donnelly Corp. et al. for ELECTRO-OPTIC MIRROR CELL, and/or U.S. provisional applications, Ser. No. 60/653,787, filed Feb. 17, 2005; Ser. No. 60/681,250, filed May 16, 2005; Ser. No. 60/690,400, filed Jun. 14, 2005; Ser. No. 60/695,149, filed Jun. 29, 2005; and/or Ser. No. 60/717,093, filed Sep. 14, 2005 by Lynam; Ser. No. 60/730,334, filed Oct. 26, 2005 by Baur for VEHICLE MIRROR ASSEMBLY WITH INDICIA AT REFLECTIVE ELEMENT; Ser. No. 60/750,199, filed Dec. 14, 2005; and/or Ser. No. 60/732,245, filed Nov. 1, 2005, which are all hereby incorporated herein by reference.

The rear reflective element substrate 14 includes a front surface 14a (the third surface of the electrochromic reflective element or cell) and a rear surface 14b (the fourth surface of the electrochromic reflective element or cell). The front or third surface 14a includes conductive coatings or layers 20, such as one or more transparent semi-conductive layers (such as an ITO layer or the like), and/or one or more metallic electrically conductive layers (such as a layer of silver, aluminum, chromium or the like or an alloy thereof), and preferably a highly reflective metallic layer or coating (such as, for example, chromium, chromium/rhodium, silver, aluminum, silver alloy, aluminum alloy, ITO/silver/ITO stack, ITO/aluminum/ITO stack (such as ITO-silver-ITO stacks and display on demand stacks or infrared transmitting stacks of the types disclosed in PCT application No. PCT/US03/29776, filed Sep. 19, 2003 by Donnelly Corp. et al. for MIRROR REFLECTIVE ELEMENT ASSEMBLY, and U.S. patent application Ser. No. 10/528,269, filed Mar. 17, 2005, now U.S. Pat. No. 7,274,501, which are hereby incorporated herein by reference) or layers or coatings of the types disclosed in PCT application No. PCT/US03/35381, filed Nov. 5, 2003 by Donnelly Corp. et al. for ELECTRO-OPTIC REFLECTIVE ELEMENT ASSEMBLY, now U.S. Pat. No. 7,184,190; U.S. patent application Ser. No. 10/533,762, filed May 4, 2005, now U.S. Pat. No. 7,184,190; and/or Ser. No. 11/021,065, filed Dec. 23, 2004 by McCabe et al. for ELECTRO-OPTIC MIRROR CELL, now U.S. Pat. No. 7,255,451; and/or PCT Application No. PCT/US04/43500, filed Dec. 23, 2004 by Donnelly Corp. et al. for ELECTRO-OPTIC MIRROR CELL, which are hereby incorporated herein by reference, or the like) applied to or deposited on and substantially over the front or third surface 14a of rear substrate 14. The reflective element assembly 10 thus may comprise a third surface transflective element assembly or cell, whereby the reflective layer or surface is disposed at the third surface of the cell or at the front surface of the rear reflective element substrate for viewing by a driver of the vehicle.

In the illustrated embodiment, the reflective element is suitable for use in an exterior rearview mirror assembly, and desirably as a frameless or bezelless reflective element assembly, such as by utilizing principles described in PCT Application No. PCT/US03/29776, filed Sep. 19, 2003 by Donnelly Corp. et al. for ELECTROCHROMIC MIRROR ASSEMBLY; PCT application No. PCT/US03/35381, filed Nov. 5, 2003 by Donnelly Corp. et al. for ELECTRO-OPTIC REFLECTIVE ELEMENT ASSEMBLY; U.S. patent application Ser. No. 10/528,269, filed Mar. 17, 2005, now U.S. Pat. No. 7,274,501; Ser. No. 10/533,762, filed May 4, 2005, now U.S. Pat. No. 7,184,190; and/or Ser. No. 11/021,065, filed Dec. 23, 2004 by McCabe et al. for ELECTRO-OPTIC MIRROR CELL, now U.S. Pat. No. 7,255,451; PCT Application No. PCT/US04/43500, filed Dec. 23, 2004 by Donnelly Corp. et al. for ELECTRO-OPTIC MIRROR CELL; and/or U.S. provisional applications, Ser. No. 60/531,838, filed Dec. 23, 2003; Ser. No. 60/553,842, filed Mar. 17, 2004; Ser. No. 60/563,342, filed Apr. 19, 2004; Ser. No. 60/629,926, filed Nov. 22, 2004; Ser. No. 60/490,111, filed Jul. 25, 2003 by McCabe et al. for FLUSH ELECTROCHROMIC CELL; Ser. No. 60/423,903, filed Nov. 5, 2002 by McCabe for ONE SIDED FLUSH ELECTROCHROMIC CELL; Ser. No. 60/412,275, filed Sep. 20, 2002 by McCabe for ELECTROCHROMIC MIRROR ASSEMBLY; Ser. No. 60/424,116, filed Nov. 5, 2002 by McCabe for ELECTROCHROMIC MIRROR ASSEMBLY; Ser. No. 60/489,816, filed Jul. 24, 2003 by McCabe for ELECTROCHROMIC MIRROR ASSEMBLY, and/or Ser. No. 60/653,787, filed Feb. 17, 2005, which are all hereby incorporated herein by reference. The reflective element is thus suitable for a heating element or heater pad 24 to be placed or positioned at the rear surface 14b of the rear substrate 14 for heating the reflective element to defog or defrost the reflective element in cold weather conditions.

Although shown and described as a heater element or pad for a frameless reflective element, clearly the heater pad and reflective element assembly of the present invention is suitable for use with non-frameless type reflective elements, such reflective elements with flush or generally aligned substrates (such as described in PCT Application No. PCT/US03/29776, filed Sep. 19, 2003 by Donnelly Corp. et al. for ELECTROCHROMIC MIRROR ASSEMBLY; PCT application No. PCT/US03/35381, filed Nov. 5, 2003 by Donnelly Corp.

et al. for ELECTRO-OPTIC REFLECTIVE ELEMENT ASSEMBLY; U.S. patent application Ser. No. 10/528,269, filed Mar. 17, 2005, now U.S. Pat. No. 7,274,501; Ser. No. 10/533,762, filed May 4, 2005, now U.S. Pat. No. 7,184,190; and/or Ser. No. 11/021,065, filed Dec. 23, 2004 by McCabe et al. for ELECTRO-OPTIC MIRROR CELL, now U.S. Pat. No. 7,255,451; and/or PCT Application No. PCT/US04/43500, filed Dec. 23, 2004 by Donnelly Corp. et al. for ELECTRO-OPTIC MIRROR CELL, which are hereby incorporated herein by reference) or reflective elements with staggered or offset substrates or the like.

As can be seen in FIGS. 2 and 3, at least a portion 20a of the third surface conductive coating 20 may continue from the third surface onto a portion 14c of the perimeter edge (where the perimeter edge or edges or edge portions of the rear substrate are between the third surface and the fourth surface of the rear substrate) so as to wrap around or coat an edge or edge portion 14c of the substrate 14, such that one of the edges 14c is coated by a portion 20a of the metallic coating (such as chromium and/or rhodium or the like), in order to establish electrical continuity between the third surface conductive coating 20 and the wraparound coating 20a on the edge portion 14c. The other edges of rear substrate 14 may not be coated by the conductive coating 20.

Although shown and described as being a wraparound portion along an edge of the rear substrate and along an overhang region 13a (discussed below) of the reflective element, it is envisioned that the wraparound coating portion may be along an edge of a staggered or offset substrate that is offset relative to the front substrate or a flush substrate that is generally aligned with or flush with the front substrate. In such offset applications, the clips or bus-bars that are typically clipped to the respective offset edge portions may be obviated.

The rear surface 14b of the rear substrate 14 (the fourth surface of the assembled reflective element assembly) may also have a fourth surface bus-bar or conductive coating 30 (such as chromium or the like) disposed over a portion of the rear surface, and a portion 30a of the fourth surface conductive coating may continue from the fourth surface onto a portion of the perimeter edge so as to wrap around or coat the edge portion or edge region 14c, in order to establish electrical continuity between the fourth surface and the edge portion. Optionally, the bus-bar portions 30, 30a may be established via an ultrasonic solder or conductive epoxy or the like, without affecting the scope of the present invention. The wraparound portion 30a of the fourth surface conductive coating 30 may overlap or overcoat the wraparound coating 20a at an overlap region of the edge 14c (the fourth surface conductive coating may overlap the third surface conductive coating at the overlap region or the third surface conductive coating may overlap the fourth surface conductive coating or the coatings may otherwise overlap one another or at least partially coincide along at least a portion of the perimeter edge, without affecting the scope of the present invention), in order to establish electrical or conductive continuity between the fourth surface conductive coating on the fourth surface and the third surface conductive coating on the third surface of the rear substrate. The rear substrate 14 thus provides a conductive wraparound that provides a conductive connection and electrical/conductive continuity from the rear or fourth surface 14b of the substrate around the edge portion 14c and to the front or third surface 14a. The coatings or coating portions 30a and 20a of the overlap region may extend substantially (such as, for example, at least 5 mm or more or less) along the respective edge or edge region or portion of the substrate.

Likewise, another fourth surface coating or bus-bar 32 may be disposed on the fourth or rear surface 14b and along another edge portion 14d. As shown in FIG. 3, the bus-bar 32 may include a wraparound or overlap portion 32b that wraps around and at least partially onto and along the edge portion 14d of the rear substrate 14. The bus-bar 32 is disposed generally along an area or perimeter region of the third surface 14a that has an isolation or non-conductive region 21 therealong. The isolation region 21 may be formed by masking the perimeter region of the third surface during the coating or deposition of the third surface of the rear substrate. The isolation region 21 may be partially covered by the seal 22, and functions to electrically isolate the third surface conductive coatings 20 from a conductive epoxy or solder or the like 34 that is applied along the edge portion 14d and at the overhang region 13b to electrically connect or establish conductive continuity between the fourth surface bus-bar 32 and the second surface conductive coating 18 at the rear surface 12b of the front substrate 12. The solder or conductive epoxy or the like may be disposed in the overhang region 13b of the reflective element and overlaps the portion 32b of the fourth surface bus-bar 32 along the perimeter edge portion 14d of the rear substrate (and may overlap the bus-bar 32 at the perimeter region of the fourth surface 14b and generally along the edge portion 14d). In the illustrated embodiment of FIG. 3, the conductive epoxy or solder is applied along the edge portion 14d and overhang region 13b, and need not extend over and onto the fourth surface of the rear substrate, since the conductive continuity is established between the fourth surface bus-bar and the transparent conductive coating at the second surface 12b of the front substrate 12 via the contact between the epoxy or solder 34 and the wraparound portion 32b of bus-bar 32 and the conductive perimeter band 19 at the second surface of the front substrate. Optionally, the solder or conductive epoxy 34 may be established over the edge portion 14d and over the perimeter region of the fourth surface 14b with or without an additional fourth surface bus-bar coating at the fourth surface of the rear substrate, without affecting the scope of the present invention, such that the solder or conductive epoxy provides or establishes the bus-bar coating at the fourth surface.

Although shown and described as being a third surface reflective element assembly or cell, the reflective element may comprise a fourth surface reflective element, with a transparent conductive coating or layer (such as ITO or the like) disposed on the third surface of the reflective element and a metallic reflecting layer or coating or reflector disposed on the fourth surface of the reflective element, without affecting the scope of the present invention. In such fourth surface reflective element applications, the third surface coating and/or a fourth surface bus-bar coating (or other coating or layer or solder or the like) may be applied over the edge portion of the rear substrate to establish conductive continuity between the third surface transparent conductive coating and the conductive bus-bar trace/coating or the like at the fourth surface of the reflective element.

Heating element or heater pad 24 comprises a flexible substrate 35, such as a thin, flexible polymeric element, such as a few thousandths of an inch (mils) thick sheet (such as a thickness of one to fifty mils or greater) of polyester or similar polymeric material, such as Mylar®, commercially available from DuPont, or the like, with a plurality of heater conductive traces 36 disposed thereon. The conductive traces 36 comprise a pair of electrically isolated traces for the heater function of the heater pad and may comprise a silver frit or the like screened onto a back surface of the flexible substrate 35, with each trace 36 terminating at or connecting to a respective electrical connector or tab or terminal 38, 40 (such as via metallic pins or posts 36a protruding through the polymeric substrate 35 and between the respective traces and terminals). The conductive traces 36 (such as a silver frit or silver containing or metal containing or graphite containing conductive material, such as a conductive epoxy or paste or layer or ink or the like) may be disposed on the attaching or first surface 35a of the substrate (the surface that faces/attaches to the fourth surface of the reflective element). The heater pad 24 may be similar to known heater pads, and may utilize aspects described in U.S. Pat. No. 4,882,466, which is hereby incorporated herein by reference. Heater pad 24 may include an adhesive layer 35c, such as a pressure sensitive adhesive (PSA), on its first surface 35a for adhering the heater pad to the rear or fourth surface 14b of the reflective element (typically, the pressure sensitive adhesive is covered by a peel away backing, whereby the backing is peeled from the polymeric substrate to expose the adhesive and the heater pad is then laid on or pressed against the rear surface of the reflective element to adhere thereto). The heater pad substrate 35 may also include an adhesive layer (such as double sided tape or a pressure sensitive adhesive or the like) on its second surface 35b, whereby a cover or film may be removed from the surface 35b to expose the adhesive/tape when attaching a back plate (not shown) to the heater pad and reflective element assembly. As best shown in FIG. 1, the conductive traces 36 may be disposed over substantially the entire heater pad substrate, except in the regions where the electrical connectors 26, 28 are located. The conductive traces generate heat when a current is applied to them via the electrical connectors or tabs 38, 40 (such as via electrical connection to a power source or wiring harness of the mirror assembly).

Although described as being a flexible polyester substrate, the heating element or heater pad of the present invention may comprise other types of sheets or substrates, without affecting the scope of the present invention. For example, the conductive traces and connectors may be applied to any flexible sheet or substrate or any rigid or substantially rigid sheet or substrate. The substrate may be supplied to a mirror sub-assembler and as supplied includes the heater traces and heater connection means and the electro-optic/electrochromic connection means.

As can be seen in FIGS. 1 and 3, electrical connector or terminal 26 is located at the heater pad at a location that will overlap or otherwise electrically connect to at least a portion of the fourth surface bus-bar 32, such as by overlapping a portion 32a of the fourth surface bus-bar 32 as can be seen in FIG. 1. Likewise, electrical connector 28 is located at the heater pad at a location that will overlap or otherwise electrically connect to at least a portion of the fourth surface bus-bar 30, such as by overlapping a portion 30b of the fourth surface bus-bar 30. Preferably, the electrical connectors 26, 28 may include electrical/conductive connection to the adhesive side or surface of the heater pad substrate 35 so that when the heater pad is applied to or pressed against or adhered to the fourth surface 14b, conductive continuity will be established between the electrical connectors 26, 28 and the fourth surface bus-bar portions 32a, 30b. For example, the heater pad substrate may include a conductive pad 42, 44 at the respective connector 26, 28 (and with conductive continuity established therebetween, such as via metallic posts 27 or the like extending through the heater pad substrate) for electrically contacting the respective bus-bar portions when the heater pad is applied to the fourth surface of the reflective element. Although shown with the connectors reflective element connectors 26, 28 being substantially similar to the heater element connectors 38, 40, clearly the connectors may comprise other types of connectors and may be different from one another. For example, the reflective element connectors 26, 28 may comprise socket type connectors for receiving a male connector from the wiring harness of the mirror assembly, or vice-versa, while the heater connectors 38, 40 may comprise spade type connectors or the like. Optionally, the various pins/terminals required to be connected to operate the heater element and the electro-optic reflective element may be grouped into a single unitary multi-pin socket (or plug) that is adapted and configured to connect with a corresponding plug (or socket) that terminates a wire harness emanating from the vehicle and out to the reflective element when the complete exterior mirror assembly is mounted on the vehicle (or locally connecting to a bus mechatronic node or the like, such as described in U.S. Pat. Nos. 5,798,575; 6,472,773; 6,340,849; 6,163,083; 6,093,976; 5,796,176; and/or 5,798,575, which are hereby incorporated herein by reference).

Optionally, and desirably, the fourth surface bus-bar portions 32a, 30b may be sufficiently or appropriately thick conductive coatings or portions, and the heater pad 24 may be applied to the fourth surface 14b of the rear substrate 14 while the conductive coatings or conductive epoxies of the bus-bar portions are still wet and unset and not cured. Thus, as the fourth surface bus-bar portions are dried/cured, the bus-bar portions function to enhance the connection/adherence of the heater pad to the fourth surface of the reflective element. Optionally, the connectors 26, 28 may be electrically connected to the respective fourth surface bus-bars or bus-bar portions via a conductive epoxy or the like (such as a solder or conductive epoxy or conductive polymeric material or a metallic strip or the like) applied over a portion of the fourth surface bus-bars and over the heater pad to the respective connector, without affecting the scope of the present invention.

The reflective element and heater pad assembly may be constructed by adhering or applying the heating element substrate to the fourth surface of the reflective element. More particularly, the reflective element may be placed in a fixture or the like, and the fourth surface traces or bus-bars or coatings may be applied to the appropriate locations at the fourth surface of the reflective element and preferably along the appropriate edge portions of the rear substrate of the reflective element. The traces may be disposed to extend partially over the fourth surface to the desired contact locations for contacting the conductive pads of the heater element when the heater element is applied to the fourth surface of the reflective element. The heater pad may then be supplied (with the heater element conductive traces and connectors and the reflective element conductive traces and connectors applied thereto), and the covering of the adhesive at the attaching surface of the heater pad substrate may be removed from the heater pad to expose the adhesive at the attaching surface of the heater pad substrate. While the conductive bus-bars/traces/coatings at the fourth surface of the reflective element are still wet or uncured or unset, the heater pad may be moved into engagement with the fourth surface of the reflective element, wherein the reflective element powering conductive pads or traces at the attaching surface of the heater pad contact and establish conductive continuity to the uncured/unset bus-bars/coatings at the contact locations at the fourth surface of the reflective element. The coatings may then set or cure (such as via air drying, UV curing or heat curing or the like) to substantially seal and electrically connect the heater pad to the fourth surface of the reflective element. The heater pad thus may be electrically connected to the bus-bars at the reflective element without having to solder leads or connectors or the like, such that the process of making a solder connection is obviated.

The coating 20 at the third surface 14a of the reflective element thus may be energized or powered via powering the electrical connector 28 at the heater pad at the rear surface 14b of the reflective element 10. Likewise, the coating 18 at the second surface 12b of the reflective element may be energized or powered via powering the electrical connector 26 at the heater pad 24 at the rear surface 14b of the reflective element. The connectors or terminals 26, 28 may comprise socket type connectors or spade type connectors or the like that allow for a quick connection to the wiring harness or wires of the mirror assembly. The heater trace connectors or terminals 38, 40 may be similarly constructed, such that the four electrical connections for the reflective element and heater pad assembly may be made via four snap type connections and/or plug-and-socket type connections directly at the rear of the reflective element. The heater pad thus comprises four isolated traces (such as silver frit traces or the like), with two traces for the heating function, and two traces/pads for contacting the fourth surface bus-bars, and with each of the four traces having an electrical connector/terminal for a snap type connection to the respective wire/connector of the mirror assembly.

Optionally, in order to establish the heater traces (and thus the heating capability) over substantially the entire substrate (including the areas around the bus-bar terminals 26, 28), it is envisioned that the heater pad may include the heater traces on the second surface (such as the surface 35b of heater pad substrate 35) of the heater pad substrate. The heater traces thus may cover substantially the entire substrate area including the areas at which the reflective element bus-bars and terminals are located, but may be substantially isolated from the bus-bar regions by the polymeric substrate. Optionally, it is envisioned that the heater pad substrate may include heater traces established at both surfaces (the first and second surfaces) of the heater pad, in order to provide a double deck or stack of heating elements to provide enhanced heating performance or capabilities to the heater pad.

Optionally, the heater pad may comprise a double layered polymeric substrate with separate layers of heater traces and bus-bar traces. For example, a first polymeric pad or substrate may be printed with the silver frit traces for the heating function, and a second polymeric pad or substrate may be printed with the silver frit traces/pads for the mirror reflective element electro-optic function. The silver frit traces for the heating function may be disposed/printed/established over substantially the entire surface of the polymeric pad, except a small area corresponding to each terminal for the bus-bar portions (where a metallic post or the like may extend through the polymeric pad for connecting the respective terminal to the respective conductive trace established on the other polymeric pad). The polymeric pads may be attached together, such as via an adhesive (such as a pressure sensitive adhesive or the like) so that the heater traces overlap the bus-bar pads/traces, but are separated from and electrically isolated from the bus-bar pads/traces via the second polymeric pad/substrate.

Optionally, the heater pad may only include the heater conductive traces and terminals, and the mirror conductive traces and terminals may be otherwise established via separate pads/substrates. For example, a flexible polymeric or polyester strip or pad or flex circuit with conductive traces established therealong (such as on a first surface of the strip or pad that opposes the fourth surface of the reflective element) may be attached (such as via an adhesive, such as a pressure sensitive adhesive or the like) to the reflective element so that the conductive traces contact one of the conductive bus-bars along a perimeter region or edge of the reflective element to establish conductive continuity between the polymeric strips and traces and the bus-bar/coating/solder established on the reflective element. Likewise, a second flexible polymeric strip or pad or flex circuit with conductive traces established therealong may be attached to the reflective element so that the conductive traces contact and establish conductive continuity with the other conductive bus-bar along another perimeter region or edge of the reflective element. For example, a flexible pad or strip may include one or more conductive traces established from a connector or terminal of the pad or strip to a contact region where the pad or strip interfaces with the conductive coating/epoxy/solder or the like at the rear surface of the reflective element. The polymeric strips or pads may each include a connector or terminal that is connected to or in conductive continuity with the respective traces of the strips, so that electrical power may be provided to the bus-bars/coatings/solders via powering of the terminal of the respective strip or pad. The polymeric strips may be adhered to the rear surface of the rear substrate at the appropriate location and/or may extend over a portion of the heater pad substrate. The heater pad and the reflective element connectors/strips thus may be provided as separate elements, such that the reflective element connectors/strips may be added or applied only to electro-optic reflective elements, while chrome or non-electro-optic reflective elements may only receive the heater pad substrate thereon. When the heater pad and reflective element connectors/strips are adhered or applied to the rear surface of the reflective element, the heater pad and pair of strips thus may provide four electrical connectors at the rear surface of the reflective element.

Optionally, the flex circuit or flexible conductive strip may be connected to the wiring harness of the mirror assembly via a sonic welding technique. The respective wires of the wire harness thus may be connected to the flex circuit via direct contact to the conductive strips or traces of the flex circuit. For example a small plastic connector or housing may be welded around the connection point of the flex circuit and wiring harness to force the two contacts (the flex circuit and wires) to come together and be joined together. Because the mechanical contact of the wires and traces is sonically welded, the connection provides a hermetic seal and thus, no additional encapsulation may be needed at the welded connections.

Optionally, the contacts may be integrated into the back plate, such that the contacts in the back plate and the heater pad may snap together as the back plate is attached to the heater pad and/or reflective element. The wire harness of the mirror assembly may then readily attach to the integrated connectors of the back plate, or the back plate may be supplied with the wire harness pre-attached to the back of the back plate.

Optionally, it is envisioned that the heater pad and back plate may be integrated, such that heating elements or traces are disposed along a portion of a back plate, such as in the manner described above, with the opposite portion of the back plate having the ring or the like for connecting the back plate and reflective element to the mirror actuator of the exterior mirror. The back plate (with the conductive heating elements or traces established thereon) may be applied to or adhered to or attached to the fourth surface of the reflective element, and with conductive portions or elements of the back plate contacting conductive bus-bar portions at the fourth surface of the reflective element when the back plate is applied to the fourth surface of the reflective element. Optionally, the electro-optic reflective element manufacturer may include terminals or posts or tabs at the fourth surface of the reflective element (and extending from the fourth surface bus-bar portions), wherein the back plate may attach to the fourth surface of the reflective element and to the posts extending therefrom, such as by adhering to the fourth surface and/or snapping or attaching to the posts or terminals or the like.

Figure 4:
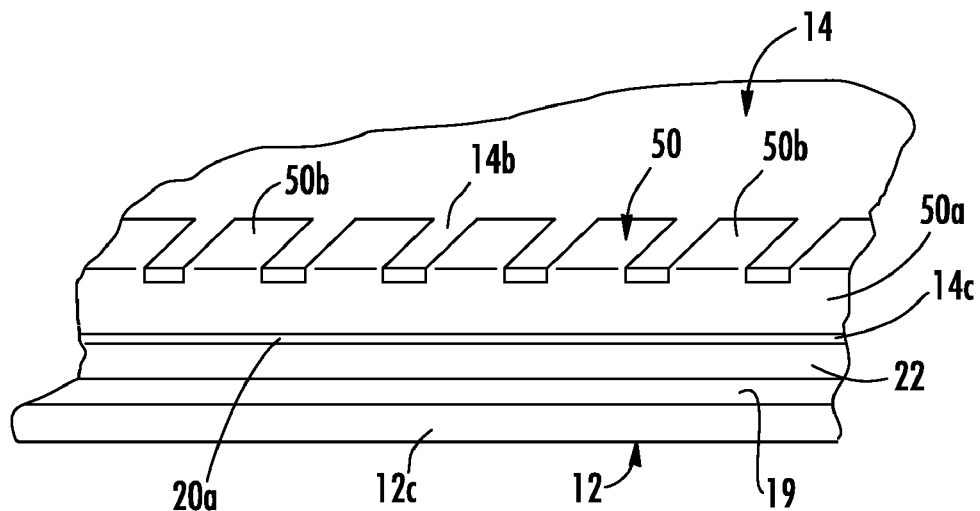
FIG. 4 is a perspective view of a connector strip of the present invention.
Figure 5:
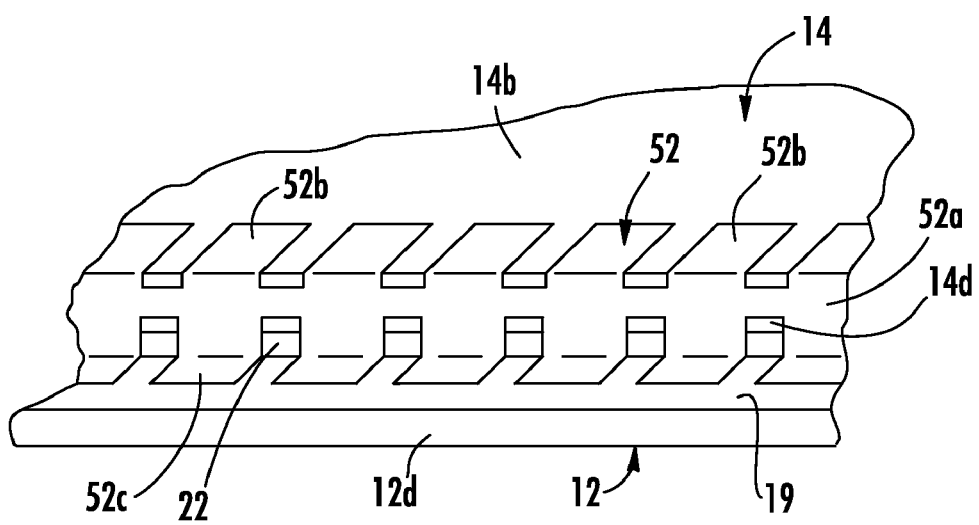
FIG. 5 is a perspective view of another connector strip of the present invention.

Optionally, the reflective element and heater pad assembly may include metallic clips or bus-bars along the edge portions of the reflective element to make electrical connection or conductive contact to the overcoated edge portions of the rear substrate. For example, and with reference to FIGS. 4 and 5, the reflective element may include a metallic connector strip or bus-bar 50 along the edge 14c of the rear substrate 14 and a metallic connector strip or bus-bar 52 along the edge 14d of the rear substrate 14. Connector strip 50 includes a continuous strip portion 50a that extends along the edge 14c and engages the overcoat or wraparound coating 20a on edge 14c, and a plurality of tabs 50b that extend from continuous strip portion 50a and that lay over the rear surface 14b of rear substrate 14 along edge portion 14c. Likewise, connector strip 52 includes a continuous strip portion 52a that extends along the edge 14d, a plurality of tabs 52b that extend from continuous strip portion 52a and that lay over the rear surface 14b of rear substrate 14 along edge portion 14d, and a plurality of tabs 52c that extend from continuous strip portion 52a and that bend to extend along and engage the coating 19 and/or 18 at the second surface 12b of front substrate 12. The connector strips 50, 52 may be attached to the reflective element, such as via a conductive epoxy or paste or the like. Although the strip 50 is designed such that it will not contact the conductive coatings 19, 18 at the front substrate, an insulating material (not shown) may optionally be applied along the overhang area 13a and between the continuous strip portion 50a and the coatings 19, 18 at the second surface 12b of front substrate 12 (such as described in U.S. patent application Ser. No. 11/021,065, filed Dec. 23, 2004 by McCabe et al. for ELECTRO-OPTIC MIRROR CELL, now U.S. Pat. No. 7,255,451; and PCT Application No. PCT/US04/43500, filed Dec. 23, 2004 by Donnelly Corp. et al. for ELECTRO-OPTIC MIRROR CELL, which are hereby incorporated herein by reference), in order to electrically isolate the connector strip 50 from the conductive coatings at the rear surface of the front substrate. A non-conductive adhesive may also be applied on the strips to keep the strips in intimate contact with the respective conductive coatings 20a, 19 at the respective side or perimeter region of the reflective element. The connector tabs 50b, 52b thus provide contact points or regions along the fourth surface of the reflective element and provide conductive continuity from the contact regions or pads to the respective conductive coating on the third surface or second surface of the reflective element. The connector strips 50, 52 may be formed or stamped from a metallic strip or sheet and thus may be readily formed to the desired shape and size for the particular application.

After the heater pad and connectors are established on the rear surface of the reflective element, a conformal coating may be applied to the rear surface of the reflective element assembly. The conformal coat may be sprayed, jetted, dispensed or brushed onto the reflective element assembly. The conformal coat may comprise a clear coating or an opaque coating, and may be cured via various curing means, such as heat, moisture or UV curing means or the like. The conformal coat protects the bus-bars and the contact points at the rear or back of the reflective element assembly. Desirably, the conformal coating is sprayed or applied to the reflective element assembly after the heater pad is attached or adhered to the rear surface of the rear glass substrate and while the rear cover or film or liner is still on the rear adhesive surface of the heater pad. The cover may then be readily removed to expose the adhesive surface of the heater pad (that is not fouled by the conformal coating) for attaching the backing plate to the heater pad.

A coating or sealant may be applied over the connectors or contacts of the heater pad, such as by potting or covering the bases of the contacts or encapsulating the contacts, such as with a silicone gel or the like. Optionally, for applications where an opaque or black coating is desired to conceal the bus-bars and the like, the conformal coating may comprise an opaque or black coating, or the conformal coating may comprise a clear coating, and a black coating or paint may be applied over the conformal coating to conceal the bus-bars, contact points and the like. It is desirable to keep the black or opaque coating or paint away from the perimeter edges of the substrates particularly for pencil seamed edges where the dark or black layer may be viewable), so it may be desirable to apply a grey coating or layer first, and then a black or dark layer or coating or paint over the first layer or coating. The paint may be applied over the protective coating and/or over the edges of the glass substrates.

After the heater pad (and any other conductive trace or strip or pad) is attached or adhered to the fourth surface of the reflective element, and coated with a protective/conformal coating and cured, a back plate (not shown) may be applied to the fourth surface and/or to the heater pad, such as by adhesive or double sided tape or the like. For example, the conformal coating may be sprayed after the heater pad is attached or adhered to the rear mirror substrate surface, and the protective cover or film at the rear of the heater pad may then be removed to expose an adhesive at the back of the heater pad, whereby the back plate may then be engaged with and adhered to the back of the heater pad via the exposed adhesive. The electrical connectors 26, 28, 38, 40 of the heater pad may protrude through corresponding holes or apertures in the back plate, so that the electrical connections may readily be made to the connectors after the back plate is attached. The openings in the back plate for the contacts may form cavities with walls around the contacts, such that the cavities may be filled with a silicone gel or the like.

Because there are no wires or leads associated with the reflective element and heater pad assembly, no routing of bus-bar wires or the like through the back plate is necessary, since only the connectors protrude from the rear of the reflective element and heater pad assembly. Optionally, and because there is no routing of wires or leads through the back plate, the positioning and attachment of the back plate to the rear surface of the reflective element may be performed automatically, such as by a robot or the like, where the back plate may be positioned (with the clips/terminals at the heater pad generally aligned with the openings in the back plate) and moved against the rear surface of the reflective element in a generally linear manner. The reflective element and heater pad assembly of the present invention thus provides for enhanced assembly processing of the reflective element and mirror assembly. Also, the heater pad includes the extra functionality of providing a snap connection to the terminals for powering the electro-optic reflective element.

Therefore, the present invention provides a heater pad that may be readily applied to or adhered to the rear surface of the reflective element, whereby the application of the heater pad also functions to establish the electrical connections to the bus-bar coatings/solder at the rear surface of the reflective element, without having to solder clips or leads onto the bus-bar coatings/solder. In order to install the heater pad and make the electrical/conductive connections between the heater pad and the reflective element, the backing cover on the adhesive side of the heater pad may be removed and the heater pad (with the pressure sensitive adhesive and conductive pads exposed) may be moved into engagement with the fourth or rear surface of the reflective element and with the bus-bars/coatings on the rear surface (and optionally before the bus-bars/coatings at the fourth surface have set or cured. The heater pad thus may be readily attached to the reflective element, with the conductive pads engaged/contacting the fourth surface bus-bars/coatings to establish conductive continuity between the conductive pads (and associated connectors) of the heater pad and the fourth surface bus-bars/coatings at the fourth surface of the reflective element. After the heater pad is adhered/attached to the rear surface of the reflective element, the conductive epoxy is cured, such as via air curing, UV curing or heat curing or the like. The conductive epoxy may be selected such that the curing process or temperature is compatible with the heater pad substrate and the pressure sensitive adhesive of the heater pad. For example, the heater pad substrate and adhesive should withstand the epoxy curing temperature or a lower temperature curing epoxy should be selected. After the epoxy is cured, the reflective element and heater pad assembly may be provided or supplied to a mirror assembly, and the electrical connections to the four terminals of the heater pad (or pads/strips) may be readily made via snapping or clipping the leads/wires from the mirror assembly to the respective terminals on the heater pad.

Optionally, the heater pad may comprise a common heater pad for both an electro-optic reflective element and a chrome (or non-electro-optic) reflective element for a particular vehicle or vehicle line. Typically, most vehicles that offer an electro-optic reflective element option also offer a low level or base chrome (or non-electro-optic) reflective element (and typically offer only a chrome reflective element for the passenger side exterior mirror). For each type of reflective element, a heater pad may be provided at the rear surface of the reflective element for automatically or selectively defogging or defrosting the reflective element. Optionally, the heater pad of the present invention may be purchased or ordered or supplied for both types of reflective elements, in order to reduce part numbers at the plant and thus enhance the assembly processes, while achieving economies of scale by ordering a larger volume of a single heater pad component/assembly. This could not be readily accomplished with conventional heater pads and back plates, because a distinct back plate is typically required for the particular reflective element applications or shapes. Because the back plate for the reflective element and heater pad assembly of the present invention does not have to be shaped like the particular reflective element shape and need only include openings or apertures for receiving the terminals of the heater pad therethrough (since various routing or retaining elements for routing/retaining the wires or leads from the reflective element are obviated by the present invention), the back plate may be a common back plate for either type of reflective element. Likewise, the heater pad may be a common heater pad for either type of reflective element. Although there would be two additional terminals that are not used for the chrome reflective element applications, the small cost of the extra terminals would not be significant as compared to the savings achieved in ordering and installing a single heater pad on both types of reflective elements.

Thus, a mirror assembler or reflective element assembler may order a common heater pad and back plate, which achieves enhanced supply chain efficiency and a reduction in part numbers in the assembly/manufacturing facility, and may apply the common heater pads and back plates to both types of reflective elements. The present invention thus provides the option of commonality of heater pads and back plates for electro-optic reflective elements and chrome (or non-electro-optic) reflective elements. The heater trace terminals (which may be separate connectors as shown and described above or may be a single or unitary connector (such as a multi-pin plug or socket or the like) that has separate terminals for powering the separate heater traces) may be readily connected to the appropriate connectors or leads of the mirror wiring for either application. For electro-optic mirrors, the reflective element terminals (which may be separate connectors as shown and described above or may be a single connector that has separate terminals for powering the coatings of the cell) may also be readily connected to the appropriate connectors or leads of the mirror wiring to electrically power the electro-optic reflective element or cell. The wiring harness of the mirror assembly may be connected to the appropriate power source or control (and may be hardwired and/or may be incorporated into a bus interface or system, such as the type described in U.S. Pat. Nos. 5,798,575; 6,472,773; 6,340,849; 6,163,083; 6,093,976; 5,796,176; and/or 5,798,575, which are hereby incorporated herein by reference) for controlling the heater pad and/or reflective element.

The heater pad (with conductive traces screened thereon), such as a common heater pad, may be laid onto the rear surface of the reflective element, and may be laid onto the rear surface of the reflective element while the fourth surface bus-bar portions/coatings are still wet and not yet cured. After the heater pad is applied to the rear surface of the reflective element, the assembly may be overlaid or overcoated with a conformal coating to protect and seal the heater pad connections at the reflective element. The coating or coatings may then be cured (such as via heat or UV curing processes) to complete the reflective element and heater pad assembly. Because the electrical connections between the heater pad and the bus-bars/coatings at the rear of the reflective element are substantially covered by the heater pad substrate and are further sealed/covered by the conformal coating, the connections are well protected against damage during shipping and from environmental effects.

By utilizing concepts of the present invention, the use of a bezel to surround the edge of the reflective element assembly may be obviated, so that a viewer looking at the mirror reflective element sees and enjoys the utility of the entire coated surface area. Thus, it is desirable to provide an opaque or dark coating or paint at the visible edge of the reflective element assembly. Optionally, the cut edge of the front substrate (that may be pencil edged or seamed or otherwise finished or seamed) may be coated or covered by a light absorbing material so that the viewability or discernibility of any imperfections in the cut edge is reduced or substantially precluded or eliminated, such as described in U.S. patent application Ser. No. 11/021,065, filed Dec. 23, 2004 by McCabe et al. for ELECTRO-OPTIC MIRROR CELL, now U.S. Pat. No. 7,255,451; and/or PCT Application No. PCT/US04/43500, filed Dec. 23, 2004 by Donnelly Corp. et al. for ELECTRO-OPTIC MIRROR CELL, which are hereby incorporated herein by reference.

As shown in FIGS. 1-3, the front substrate 12 of reflective element assembly 10 has a height dimension that is greater than a corresponding height dimension of the rear substrate 14, such that the upper perimeter region or edge portion 12*c* and lower perimeter region or edge portion 12*d* of front substrate 12 extend beyond the corresponding perimeter regions or edge portions 14c, 14d of rear substrate 14 and define upper and lower overhang regions 13a, 13b (such as described in PCT application No. PCT/US03/35381, filed Nov. 5, 2003 by Donnelly Corp. et al. for ELECTRO-OPTIC REFLECTIVE ELEMENT ASSEMBLY, U.S. patent application Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 11/226,628, filed Sep. 14, 2005; and/or Ser. No. 11/021,065, filed Dec. 23, 2004 by McCabe et al. for ELECTRO-OPTIC MIRROR CELL, now U.S. Pat. No. 7,255,451; and/or PCT Application No. PCT/US04/43500, filed Dec. 23, 2004 by Donnelly Corp. et al. for ELECTRO-OPTIC MIRROR CELL, and/or U.S. provisional application Ser. No. 60/653,787, filed Feb. 17, 2005, which are all hereby incorporated herein by reference). By having the front substrate taller than the rear substrate and defining overhang regions at both the upper and lower regions of the reflective element assembly, the reflective element assembly may be placed or disposed at or in the bezel or casing (or the bezel or casing may be molded directly around the reflective element assembly) without exposing the seal between the substrates to shear stresses, such as may otherwise occur at the seal when the substrates are offset in either direction. Also, the overhang regions (defined by the under-sized rear substrate relative to the front substrate) of the reflective element assembly of the present invention provide essentially a circumferential ledge or edge (such as a ledge extending approximately 0.5 mm beyond the edge of the rear substrate) for a soldering device to follow around the reflective element assembly to provide enhanced soldering of the raceway around the conductive coatings. The soldering device may be moved along (such as by a computer numerical control (CNC) or the like) and substantially around the cell at the overhang regions (such as by following the edge of the rear substrate) and may apply the solder thereto, in order to apply solder lines along the respective perimeter edges of the reflective element assembly. One bead of solder thus contacts the conductive ITO layer (or the like) on the front substrate but does not come into electrical contact with the conductive coating or layer on the rear substrate, while another bead of solder may contact the wrap-around coatings 20a, 30a to electrically connect to the third surface coatings or layers, but without electrically contacting the second surface coatings or layers.

Optionally, an encapsulant may be provided at the overhang regions to seal and protect the solder and coatings of the reflective element assembly. For example, the encapsulant or potting material (such as, for example, a silicone or urethane elastomer, preferably a conductive at least partially or semi-elastomeric material or the like) may be applied or positioned over the rear surface (and may be applied partially or entirely around the outer perimeter edge of the substrate) to environmentally protect, such as by sealing, the connection of the connector terminals and the conductive layers, such as described in PCT application No. PCT/US03/35381, filed Nov. 5, 2003 by Donnelly Corp, et al. for ELECTRO-OPTIC REFLECTIVE ELEMENT ASSEMBLY; and U.S. patent application Ser. No. 10/533,762, filed May 4, 2005, now U.S. Pat. No. 7,184,190, which are hereby incorporated herein by reference.

The reflective element assembly of the present invention thus provides an enhanced assembly that may be readily manufactured and assembled. The overhang regions of the present invention provide for enhanced manufacturing and assembly processes and provide benefits of simplicity in the reflective element design and assembly over prior known approaches, such as the mirror assemblies of the type described in U.S. pat. pub. No. US2004/0032638, published Feb. 19, 2004 by Tonar et al. for ELECTROCHROMIC DEVICES WITH THIN BEZEL-COVERED EDGE, which is hereby incorporated herein by reference.

Figure 6:
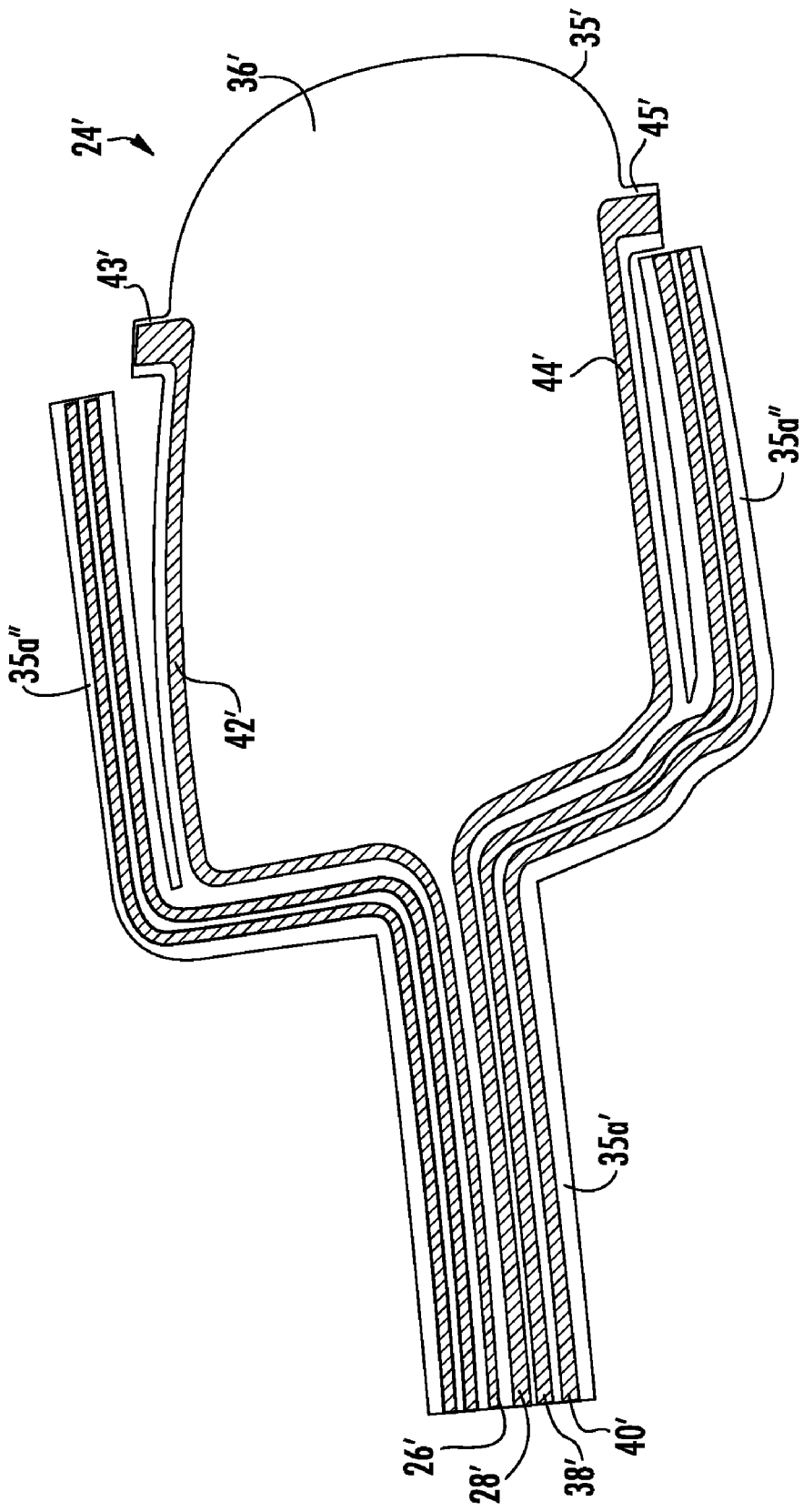
FIG. 6 is a perspective view of a flexible heater pad of the present invention.

Optionally, and with reference to FIG. 6, a flexible heater pad or sheet 24' may include a plurality of heater conductive traces 36' and a pair of conductive traces 42', 44' are provided on a thin sheet or ribbon 35'. The heater traces 36' are in electrical or conductive connection with a corresponding conductive strip or trace 38', 40' for connecting to a connector or wire or harness of the mirror assembly. Likewise, the conductive traces 42', 44' are in electrical or conductive connection with a corresponding conductive strip or trace 26', 28' for connecting to a connector or wire or harness of the mirror assembly. The heater pad or sheet thus may be applied (such as via an adhesive or double sided tape or the like) to the rear of the reflective element, whereby the electrical connections between the conductive traces 42', 44' are made to the bus-bars or coatings or the like of the reflective element, and the traces 38', 40', 26', 28' may be connected to one or more connectors or leads at the mirror assembly when the reflective element is mounted thereat.

As shown in FIG. 6, the conductive traces 42', 44' may terminate in a respective flexible flap or tab 43', 45', which may overlay a respective bus-bar coating or portion at the rear surface of the reflective element or which may fold or bend at least partially around the respective edge portion of the rear substrate to contact an edge coating or solder at the respective edge portion. A conductive epoxy may be applied to the connection area to ensure a good electrical connection between the traces 42', 44' and the respective conductive coatings/solders/layers at the reflective element.

Optionally, the connecting strip 35a' for electrically connecting or establishing conductive continuity between the heater pad or sheet and the wiring harness or circuitry of the mirror assembly may comprise a single strip with four conductive traces 38', 40', 26', 28' thereon, such that a single connection may be made to the mirror assembly. The strip 35a' is a flexible ribbon or strip that may be readily flexed or bent to connect to a connector at the mirror assembly or at the end of a wiring harness or ribbon of the mirror assembly. Optionally, the heater pad or sheet 24' may include two or more connector strips (as also shown at 35a"), where one strip may include the conductive traces for the heater traces, while the other strip may include the conductive traces for the reflective element traces. The strips may then be flexed or bent to connect to the corresponding connectors at the mirror assembly.

The heater pad or sheet of the present invention thus provides a flexible heater pad with the conductive traces and connectors integrally formed thereon, whereby attachment and electrical connection of the heater pad or sheet to the reflective element is made via adhering the heater pad or sheet to the rear surface of the reflective element. The heating elements or traces and the cell powering elements or traces are provided on the heater pad or substrate and are separate from and isolated from and not contiguous with one another. Each of the traces terminates at an electrical connector or terminal or pin at the rear surface of the heater pad for connecting to respective connectors or terminals of a wiring harness or the like at the mirror assembly. The electrical connection of the heater pad and reflective element assembly may thus be made to a wiring harness or electrical connector or connectors at the mirror assembly via one or more electrical connections.

Although shown and described as a heater pad attached to the fourth surface of a reflective element, aspects of the present invention may be suitable for attaching other elements or devices to other surfaces. For example, a printed circuit board substrate (such as a substantially rigid or flexible substrate upon which circuitry or traces may be disposed) may be attached to a fourth surface of a rear substrate of an interior rearview mirror assembly, so as to provide electrical contact between circuitry or accessories on the circuit board substrate and circuitry or elements or traces at the fourth surface of the interior mirror reflective element. Aspects and principles described herein may also or otherwise be suitable for other applications, without affecting the scope of the present invention.

Optionally, the reflective element, either with or without a heater pad or the like, may have fourth surface bus-bars or pads or elements or coatings or layers or the like for electrically connecting to the second and third surface conductive coatings or layers, and the clips or connectors for the reflective element may connect to the fourth surface bus-bars. The fourth surface bus-bars may provide electrical conductive connectivity to the second and third surface conductive coatings.

Figure 7:
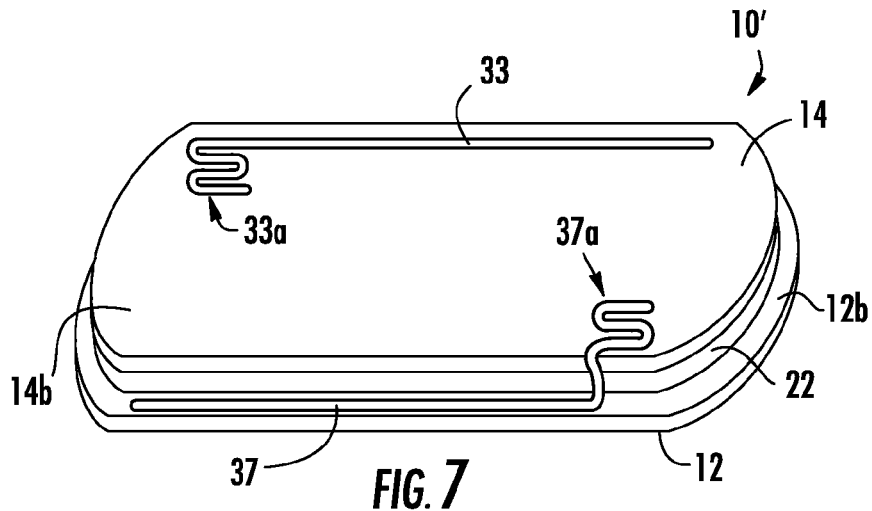
FIG. 7 is a perspective view of a reflective element of the present invention.
Figure 8:
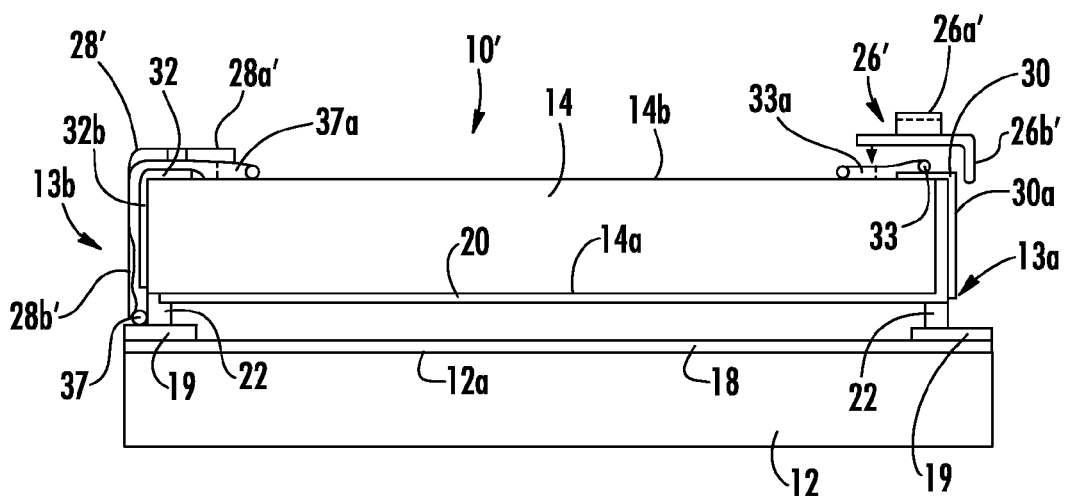
FIG. 8 is a sectional view of the reflective element of FIG. 7.

For example, and with reference to FIGS. 7 and 8, the electro-optic or electrochromic reflective element assembly 10' includes a front substrate 12 and a rear substrate 14 and an electro-optic medium 16 disposed therebetween and substantially encompassed by a perimeter seal 22 around the electro-optic medium and between the substrates 12, 14. The reflective element assembly 10' may be substantially similar to the reflective element assembly 10 discussed above, such that a detailed discussion of the reflective element assemblies will not be repeated herein. The components of reflective element assembly 10' are thus shown in FIGS. 7 and 8 with similar reference numbers as used in FIGS. 2 and 3 for reflective element assembly 10, discussed above.

The electro-optic reflective element 10' includes a transparent conductive coating or layer 18 substantially over the rear surface 12b of front substrate 12 and a metallic reflective conductive coating or layer (or coatings or layers) 20 substantially over the front surface 14a of the rear substrate 14. The coatings may comprise any suitable conductive and reflective/transparent coatings or layers, such as the types described in U.S. Pat. Nos. 6,690,268; 5,668,663 and/or 5,724,187, and/or in U.S. patent application Ser. No. 10/054,633, filed Jan. 22, 2002 by Lynam et al. for VEHICULAR LIGHTING SYSTEM, now U.S. Pat. No. 7,195,381; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 11/284,543, filed Nov. 22, 2005; Ser. No. 11/226,628, filed Sep. 14, 2005; and/or Ser. No. 11/021,065, filed Dec. 23, 2004 by McCabe et al. for ELECTRO-OPTIC MIRROR CELL, now U.S. Pat. No. 7,255,451; and/or PCT Application No. PCT/US03/29776, filed Sep. 9, 2003 by Donnelly Corp. et al. for MIRROR REFLECTIVE ELEMENT ASSEMBLY; and/or PCT Application No. PCT/US03/35381, filed Nov. 5, 2003 by Donnelly Corp. et al. for ELECTRO-OPTIC REFLECTIVE ELEMENT ASSEMBLY; and/or U.S. provisional applications, Ser. No. 60/630,061, filed Nov. 22, 2004 by Lynam et al. for MIRROR ASSEMBLY WITH VIDEO DISPLAY; Ser. No. 60/629,926, filed Nov. 22, 2004 by McCabe et al. for METHOD OF MANUFACTURING ELECTRO-OPTIC MIRROR CELL; Ser. No. 60/531,838, filed Dec. 23, 2003; Ser. No. 60/553,842, filed Mar. 17, 2004; Ser. No. 60/563,342, filed Apr. 19, 2004, and/or Ser. No. 60/653,787, filed Feb. 17, 2005, and/or PCT Application No. PCT/US03/40611, filed Dec. 19, 2003 by Donnelly Corp. et al. for ACCESSORY SYSTEM FOR VEHICLE, which are all hereby incorporated herein by reference.

As shown in FIGS. 7 and 8, the rear substrate 14 may have a smaller width or height or length dimension so that the reflective element has overhang regions 13a, 13b along respective edge portions of the reflective element, such as described in U.S. patent applications, Ser. No. 11/226,628, filed Sep. 14, 2005; and/or Ser. No. 11/021,065, filed Dec. 23, 2004 by McCabe et al. for ELECTRO-OPTIC MIRROR CELL, now U.S. Pat. No. 7,255,451, and/or U.S. provisional application Ser. No. 60/653,787, filed Feb. 17, 2005, which are hereby incorporated herein by reference. Although shown and described as an electrochromic reflective element, the reflective element may comprise any other type of electro-optic mirror reflective element or the like, without affecting the scope of the present invention. Reflective element 10 includes fourth surface electrically conductive bus-bars or elements or electrical connection sites 30, 32 (such as metal thin film coatings) at the rear surface 14b of rear substrate 14 of reflective element 10. The fourth surface electrically conductive bus-bars 30, 32 may include wrap-around conductive portions 30a, 32b to electrically conductively connect the fourth surface conductive bus-bars 30, 32 to the third surface conductive coatings or layers 20 or second surface transparent conductive coating or layer 18, respectively, such as by utilizing principles described above and/or in U.S. patent application Ser. No. 11/226,628, filed Sep. 14, 2005; and/or Ser. No. 11/021,065, filed Dec. 23, 2004 by McCabe et al. for ELECTRO-OPTIC MIRROR CELL, now U.S. Pat. No. 7,255,451; and/or U.S. provisional application, Ser. No. 60/653,787, filed Feb. 17, 2005 by Karner et al. for MOUNTING ASSEMBLY FOR MIRROR AND METHOD OF MAKING SAME, which are hereby incorporated herein by reference. As shown in FIG. 8, the wrap-around portion 32b may extend along the edge of the rear substrate and along the seal to contact the second surface conductive coating 18 and/or the perimeter band or perimetal border coating 19 (and may comprise or may be covered or encompassed by a conductive epoxy or solder (such as metal solder or the like) material or the like disposed at the overhang region 13a of the reflective element 10). As can be seen in FIG. 8, the wrap-around or overcoated portions 32b, 30a of the bus-bars may substantially cover the respective edge regions of the rear substrate.

The electrical contacts or connectors of the mirror circuitry may electrically/conductively contact or connect to connectors 26', 28' at the respective fourth surface bus-bars 30, 32 to establish electrical connection to the reflective element. As shown in FIGS. 7 and 8, a bead of conductive epoxy 33 may be disposed along a perimeter region of the rear substrate surface and may be dispensed to form an attachment pad 33a or the like at the rear surface. Another bead of conductive epoxy 37 may be disposed along a perimeter region of the rear surface of the front substrate and around the perimeter edge of the rear substrate and onto the rear substrate surface to form an attachment pad 37a or the like at the rear surface of the rear substrate. Electrical connection between the circuitry contacts and the fourth surface bus-bars 30, 32 may be established and maintained via the conductive epoxy beads 33, 37 or solder or the like, or via mechanical connection of the circuitry contacts to the bus-bars or biasing of the circuitry contacts to the bus-bars or the like, without affecting the scope of the present invention.

Although described herein as conductive epoxy beads and pads, the term "conductive epoxy" is used as an illustrative material, and is not intended to be limited only to a conductive epoxy. Other conductive materials that may be dispensed or applied, typically in a fluid state, and then, when applied, may be cured or set to a substantially hardened or firm state, may be utilized at the reflective element in the manner described herein, without affecting the scope of the present invention. The conductive material thus may form a substantially fluid bead or pad or the like on which the metallic clip or connector may be placed, and then the conductive material may be cured to substantially and at least temporarily hold the connector in place so that the electrical connections to the circuitry wiring leads may be made at the reflective element, such as by soldering or mechanical connection/attachment. The conductive material may be cured via any curing means, such as self activation by chemical reaction and/or UV exposure and/or thermal exposure and/or inductive heating and/or the like, to form a set material or substantially hardened or substantially non-fluid or firm material that may substantially hold the clips in place at the rear substrate surface of the reflective element.

Figure 9B:
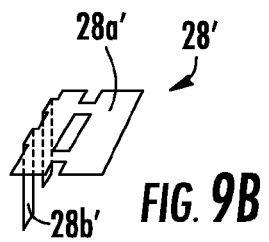
FIGS. 9A and 9B are perspective views of electrical connectors suitable for use with the reflective element of the present invention.
Figure 9A:
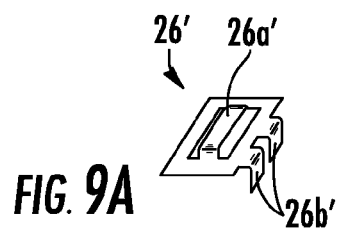

As shown in FIGS. 9A and 9B, metallic connectors or clips 26', 28' may be attached to the rear surface of the rear substrate, such as at the attachment pads 33a, 37a. The connectors or clips may comprise a metallic material, such as copper, copper alloy, tin plated copper alloy, nickel, silver or the like, and may comprise stainless steel (such as if the circuitry leads are mechanically attached to the clips and not soldered to the clips), without affecting the scope of the present invention. Desirably, the clips 26', 28' may be placed on the attachment pads 33a, 37a while the epoxy is wet and before it is cured. In the illustrated embodiments, the clips 26', 28' have openings therethrough for the wet epoxy to flow through and around portions of the clips to enhance the securement of the clips to the rear substrate surface when the epoxy is cured. Optionally, the clips (such as shown at clip 26' in FIG. 9A) may include an extension or tab 26a' for mechanically connecting to a lead connector. As discussed below, the extensions may be bent or formed generally along the substrate surface to facilitate connection thereto and to facilitate encompassing the clips with a glob encapsulant after the electrical connection is made. Optionally, the clips (such as shown at clip 28' in FIG. 9B) may provide a generally flat pad 28a' for an electrical lead to be soldered to when making the electrical connections.

As can be seen with reference to FIGS. 8 and 9A, the clip 26' may include legs 26b' that extend along the wraparound portion on the edge of the rear substrate to extend over the edge of the rear substrate to assist in positioning the clip at the appropriate location at or near to the edge of the rear substrate. The legs extend partially along the edge and over the wraparound coating and thus may also enhance the electrical connection to the wraparound coating and thus to the third surface coating 20. The length of the legs 26b' is selected so that the legs do not extend past the front surface of the substrate, in order to limit or substantially preclude shorting of the cell. For example, the legs may be approximately 1.2 inn long, while the thickness of the rear substrate may be 1.6 mm. Optionally, and as can be seen with reference to FIGS. 8 and 9B, the clip 28' may include longer legs 28b' that may extend across the edge of the rear substrate and may span the seal thickness to contact the epoxy bead and/or perimeter band coating at the rear surface of the front substrate. In such an application, the epoxy pad 37a may not be needed to provide sufficient conductive continuity between the metallic connector and the second surface conductive coating or coatings. Although the clip 28' is shown in FIG. 9B with a flat attachment pad 28a', the clip may otherwise have an attachment extension similar to that shown in FIG. 9A, and/or the clip 26' may include a substantially flat attachment pad similar to that shown in FIG. 9B, or the clips may provide other attachment means at the rear surface of the rear substrate, without affecting the scope of the present invention.

Optionally, the reflective element may be placed in a jig or fixture and a conductive epoxy (or other suitable material) may be disposed at and over the fourth surface bus-bars. Before the conductive epoxy sets or cures, metallic clips or bus-bars or elements or connectors 26', 28' may be placed into the conductive epoxy so that the clips are set into and substantially enveloped by the wet conductive epoxy. The reflective element and conductive epoxy may then be cured so that the conductive epoxy sets or cures around the clips to substantially secure the clips to the fourth surface of the reflective element. The clips thus make substantial electrical contact with the respective fourth surface bus-bar or coating, which establishes conductive continuity with the respective second or third surface coatings via the wraparound portions or layers or coatings. The leads of the circuitry may then be connected to the clips or connectors, such as via solder or mechanical attachment, and a UV curable acrylic (or other suitable sealant) may be applied to the electrical connection and cured to provide a substantially strong or robust electrical connection to the reflective element. A conformal coating (such as a UV curable conformal coating or the like) may be applied over the fourth surface of the reflective element to substantially seal and protect the reflective element.

Optionally, the clips or connectors at the fourth surface bus-bars may comprise spade connectors or clip connectors or crimp connectors (where the lead or wire may be inserted into a receiving portion of the connector and the receiving portion may be crimped to substantially secure the wire therein) or the like. Optionally, a spade connector may be formed or bent (as shown in FIGS. 8 and 9A) so as to extend generally along the fourth surface of the reflective element (the rear surface of the rear substrate) when the connector is attached to the fourth surface of the reflective element. This may be desirable because when the connector protrudes outwardly and away from the fourth surface (such as typically about 6 mm out from the surface of the reflective element), the connector may contact or interfere with other components of the mirror assembly during assembly of the mirror assembly. Also, if the connectors are bent or formed to be generally along the rear surface of the reflective element, the connectors may be readily covered or enveloped by an encapsulant, such as a UV curable acrylic or the like. The encapsulant or UV curable acrylic may substantially encompass and encapsulate the connectors or clips and preferably may contact the glass surface around the clips to enhance the adhesion or bonding of the encapsulant and clips to the rear substrate. Optionally, the attachment and dispensing and curing processes may be performed with a single machine or fixture, and the encapsulant and conformal coating may be cured via the same curing process. Optionally, the encapsulant may comprise other types of materials or compositions, such as another UV curable material, such as a urethane or a silicone material or an acrylate material, a chemically curable material, such as an epoxy, a self curable material, a thermally curable material, an inductively curable material and/or the like, without affecting the scope of the present invention. When the conductive epoxy is applied over the fourth surface bus-bars and/or the rear or fourth surface of the reflective element, it is desirable that the epoxy (and the clips or connectors attached thereto or set therein) make intimate electrical contact to the fourth surface bus-bars. If the fourth surface bus-bars oxidize after they are deposited on the rear substrate surface and before the connector and epoxy are applied thereto, the oxidation may impede or interrupt the conductive contact at the fourth surface bus-bars. In order to reduce the oxidation effect at the fourth surface bus-bars, the material of the fourth surface bus-bars may be selected to provide reduced oxidation properties. For example, the fourth surface bus-bars may comprise a metal with a low Gibbs energy of oxide formation, such as, for example, gold or gold alloy or chrome alloy or the like (and may be alloyed to retard or reduce oxidation), so that reduced oxidation may occur at the fourth surface bus-bars.

Optionally, the fourth surface bus-bars may be cleaned or processed to reduce or remove oxidation that may have occurred at the bus-bars. Such a layer or oxidation, if it occurs, may reduce the conductive continuity between the clips and the coating at the substrate surface. Optionally, the fourth surface bus-bars may be wiped or processed with a chemical (such as chromium etchant type TFD, such as commercially available from Transene Corp. of Mass., or other suitable acidic and/or basic chemical or material etchant or the like) to remove or reduce oxidation before the electrical connection to the fourth surface bus-bars is made. Optionally, the fourth surface bus-bars may be mechanically cleaned, such as via an abrasive medium or the like, to mechanically remove or reduce oxidation at the fourth surface bus-bars before the electrical connection to the fourth surface bus-bars is made. Optionally, the fourth surface bus-bars may be cleaned or processed via a laser or ion beam or the like to remove or ablate or reduce oxidation at the fourth surface bus-bars before the electrical connection to the fourth surface bus-bars is made. Optionally, a thin layer of a substantially non-oxidizing material (such as metals with a low Gibbs energy of oxide formation, such as gold, silver, rhodium, platinum, palladium or the like, or their alloys with each other or with other metals) may be deposited on the chromium layer before the chromium layer is exposed to the atmosphere, in order to reduce oxidation at the chromium layer. Because the layer of substantially non-oxidizing material may be substantially thin (such as about 150 Angstroms or thereabouts) as compared to the conductive layer of chromium (which may be about 2000 Angstroms thick), such materials may be implemented without excessive cost increase. Optionally, a conductive ink or the like may be disposed over the fourth surface bus-bars to reduce the oxidation effect (or reduce build-up of any other surface layer that could impede efficient electrical contact to the surface) at the interface between the bus-bars and the conductive epoxy. The conductive ink may be used instead of the conductive epoxy, or may be disposed as a layer between the chromium layer and the conductive epoxy. The oxidation (or any other layer that might impede intimate electrical contact by causing interfacial electrical resistance) at the fourth surface bus-bars thus may be removed or reduced physically, chemically, mechanically or materially or the like, in order to enhance the interface between the conductive epoxy (or other suitable material) and the fourth surface bus-bars and thus to enhance the electrical connection to the fourth surface bus-bars. Similar approaches may also or otherwise be implemented to enhance the interface between the conductive epoxy and the perimeter band.

Thus, a mechanically and environmentally secure connection can be made to the rear substrate and electrodes thereon utilizing aspects of the present invention. The set up and/or curing of the conductive epoxy (or other suitable or equivalent material) at least temporarily secures the metal clip to the substrate, thereby providing a convenient solder point (such as by automatic soldering) and/or stable attachment point (such as a spade connector) for mechanical attachment of the circuitry leads to the clips. Once the wire connection is made, the UV curable acrylic (or other suitable or equivalent resinous encapsulation/potting material) and the conductive epoxy (or other suitable or equivalent material) provide a substantially strong bond or connection of the clips and connectors to the rear surface of the rear substrate while at the same time providing environmental protection for the wire connection, for the metal clip, and for the fourth surface bus bar to which the metal clip contacts (should so be desired/required), so that the overall assembly can pass extended environmental testing such as at least 1000 hours in a humidity chamber or more than 240 hours in a salt spray chamber and so that the part can be used on a vehicle.

Optionally, the reflective element may include fourth surface bus-bars and a fourth surface coating for the heater pad application. In such an application, the coating may be separated or demarcated to provide the fourth surface bus-bars (that connect to the wraparound portions and thus to the second and third surface conductive layers or coatings) and the heater pad coating (that may substantially cover the rear surface of the rear substrate). The coating may be separated or demarcated via a mask over selected portions of the substrate surface during deposition of the coating, or may be separated or demarcated via sand blasting or laser ablating after the coating is applied substantially over the substrate surface and over or in connection with the wraparound portions.

The perimeter coating 19 at the rear or second surface 12b of the front substrate thus may be substantially opaque or non-transparent so as to conceal the seal and encapsulant and the like at the outer perimeter regions and/or overhang regions of the cell. Optionally, the perimeter coating or band may comprise a metallic reflective coating, and the material and thickness of the metallic coating and/or any transparent electrical conductor (such as ITO) that it may overcoat, may be selected to provide the desired appearance and/or color at the perimeter of the reflective element, such as described in U.S. patent application Ser. No. 11/021,065, filed Dec. 23, 2004 by McCabe et al. for ELECTRO-OPTIC MIRROR CELL, now U.S. Pat. No. 7,255,451; and/or PCT Application No. PCT/US04/43500, filed Dec. 23, 2004 by Donnelly Corp. et al. for ELECTRO-OPTIC MIRROR CELL, which are hereby incorporated herein by reference. Optionally, the perimeter band may comprise other materials, such as substantially non-metallic light absorbing materials, such as a light absorbing conductive ink or the like, and thus may provide an opaque and/or non-reflective or light absorbing band around the perimeter of the reflective element.

Because the overhang regions may have a conductive solder or conductive epoxy disposed therealong (as described above), the conductive solder/epoxy may provide a sufficiently thick conductive track or raceway along the respective perimeter region. Therefore, the perimeter band at the rear surface of the front substrate need not be a substantially conductive metallic material. Thus, the perimeter band may comprise a thin coating or layer of conductive ink (which may be established thereon at a thickness of about 25 microns or thereabouts), which, in conjunction with the conductive epoxy or solder or encapsulant, provides sufficient conductivity along the raceway of the perimeter region of the rear surface of the front substrate. For example, the conductive ink may comprise a silver flake-based epoxy or the like, and may comprise a conductive ink of the types commercially available from Creative Materials Inc. of Tyngsboro, Mass., such as a 101-42 electrically conductive ink or the like, which has a silver filler and a sheet resistivity of about 0.015 ohms per square, and is suitable for application by stamping, screen printing, dipping and syringe dispensing on various surfaces, such as Kapton, Mylar, glass, ITO sputtered surfaces and the like. Optionally, the conductive ink may comprise a "smart ink" of the types available from Flint Ink Corp. of Ann Arbor, Mich., and/or Precisia, LLC of MI, or other conductive inks of the types available from Conductive Compounds of Londonderry, N.H., or other conductive inks of the types available from Epoxies, etc. of Cranston, R.I. Such smart or conductive inks may also or otherwise be used in a variety of applications, such as for antennae and the like. Preferably, the material may be selected so that the material can be fired or fused to the transparent conductive coating or layer (such as ITO) on the rear surface of the front substrate to adhere to the transparent conductive layer or rear surface of the front substrate and provide an environmentally durable or tough perimeter band around the perimeter region of the reflective element.

The conductive ink (or other conductive composition) perimeter band may be pad printed on the ITO layer of the second surface and at a thickness of less than or equal to about 25 microns, such as about 10 microns or thereabouts. Thus, if a small variation in the thickness of the ink band/layer occurs (such as about a 10 percent variation in thickness or thereabouts), the variation in actual physical thickness of the ink band/layer will be small, such as about one to two microns or thereabouts, and thus may have a negligible effect on the thickness and uniformity of the epoxy seal (which may be about 75 to 135 microns thick, such as about 85 microns thick). However, if desirable, the thickness of the printed or otherwise applied conductive perimeter band may have a thickness of less than 10 microns or greater than 25 microns, depending on the particular composition used, the precision and uniformity of application (such as via pad printing, ink jet printing, offset printing or the like), and/or the interpane thickness between the front and rear substrates of the reflective element. The thin ink band thus facilitates a substantially uniform seal thickness for the reflective element or cell, since such small band thickness variations will not dictate the uniformity or variation of the epoxy seal. Although shown and described as being established at or on a substrate of an exterior rearview mirror for a vehicle, such a conductive ink band may also be suitable for use on a rear surface of a front substrate of an interior rearview mirror assembly of a vehicle, such as for use as an opacifying layer or band, such as described in PCT application No. PCT/US03/35381, filed Nov. 5, 2003 by Donnelly Corp. et al. for ELECTRO-OPTIC REFLECTIVE ELEMENT ASSEMBLY; and U.S. patent application Ser, No. 10/533,762, filed May 4, 2005, now U.S. Pat. No. 7,184,190, which are hereby incorporated herein by reference.

Optionally, the conductive ink may comprise a dark colored ink, such as a black ink or the like, or may comprise a colored ink if desired, in order to provide a desired color scheme to the perimeter band around the perimeter of the reflective element. Optionally, the perimeter ink band may be printed or screened or otherwise applied to the perimeter region of the substrate, and may include text or characters or icons or other indicia around the perimeter region, such as an automaker logo or a text message or the like. For example, the conductive ink may be pad printed at the perimeter region of the substrate, which may include a mask or masks around the perimeter region, such that the desired logo or text or indicia is formed in the perimeter ink band and viewable by the driver or occupant of the vehicle. Optionally, the perimeter ink band may comprise a double layer of inks, such as a thin layer of colored conductive ink disposed onto the perimeter region of the ITO coated surface, and a more conductive coating printed or otherwise disposed over the colored conductive ink.

Optionally, if a spectrally selective/anti-glare colored band or a non-spectrally selective, substantially silvery reflective band is desired around the perimeter of the reflective element, the material and/or thickness of the band and of the transparent coating may be selected to provide the desired appearance. For example, if a silvery appearance (such as a substantially non-tinted/non-colored/non-spectrally selective band) is desired for the perimeter band, an aluminum coating (or aluminum alloy) or band may be disposed around the perimeter region to provide the desired silvery appearance. The aluminum band provides a silvery, substantially non-spectrally biased/selective appearance throughout a range of thicknesses of the transparent conductive coating (such as ITO) that it may overcoat on the rear surface of the front substrate (and between the front substrate and the aluminum band), such as when the aluminum band or layer is applied to an ITO layer having an ITO thickness of between about 750 Angstroms to about 1500 Angstroms.

The aluminum material may comprise various grades of aluminum, such as marine grade aluminum or the like, and preferably that has enhanced magnesium content (such as an aluminum material with magnesium (or other materials, such as titanium or the like) alloyed or incorporated or added to the aluminum material or composition). The aluminum composition or alloy may comprise various grades of aluminum, such as, for example, 1100 or 6061 aluminum alloys. Optionally, the aluminum material or composition may comprise SEAlium® (available from Pechiney Marine and having a weight content of about 0.25% Si; about 0.25% Fe; about 0.2% Cu; about 0.7-1% Mn; about 4-5.2% Mg; about 0.25% Cr; about 0.4% Zn; about 0.15% Ti; about 0.2% Zr and the remainder content being Al) or other such high magnesium content aluminum alloy, such as alloys similar to those classified in the 5000 index or grade or series, such as, for example, 5083 alloy, 5086 alloy, 5383 alloy, and/or 5784 alloy or the like. The aluminum band may be deposited via a sputter coating or sputter deposition process, such as in a vacuum sputter deposition chamber. Preferably, the aluminum material is deposited or sputtered onto the unmasked perimeter region of the rear surface of the front substrate in a manner that reestablishes in the coating/band on the substrate the elemental composition of the sputtered material (such that the material composition of the sputtered coating is substantially similar to the material composition of the sputter target). The aluminum band may be sputtered to a desired thickness and provide a band of aluminum at the perimeter region and at which the seal is applied when the cell is assembled.

Optionally, the aluminum band (or other reflective coating or layer, such as aluminum alloy, silver, silver alloy, rhodium or the like) may be sputtered to a desired thickness and a band/layer of metal that has enhanced environmental resistance/resilience than, for example, aluminum or its alloys or silver or its alloys (such as, for example, an enhanced environmentally resistant/resilient material such as chromium, stainless steel or other steels, nickel alloy such as inconel, titanium, molybdenum or the like) may be deposited/sputtered over the aluminum band to provide a protective conductive layer over the aluminum band. For example, the aluminum band may be sputter coated (such as via energizing an aluminum target in a sputter deposition chamber or the like) onto the unmasked perimeter region of the substrate surface to a desired thickness (such as about 300 Angstroms or thereabouts). The target may be flipped or rotated or changed (or the substrate may be moved to another sputter station) so that a target of the enhanced environmentally resistant/resilient material or composition (such as chromium or the like, such as listed above) may be energized, and so that the metal so sputtered onto the unmasked aluminum band at the substrate surface overcoats and thus environmentally protects the underlaying aluminum layer (or other highly reflective metallic material, such as aluminum alloys or silver or its alloys or rhodium or the like).

For example, chromium may be used as the enhanced environmentally resistant or resilient material, and a chromium target may be energized so that chromium is sputtered onto the unmasked aluminum band at the substrate surface. The chromium may be deposited onto the aluminum band to a desired thickness, such as about 500 Angstroms to about 1000 Angstroms or thereabouts or more. The chromium and aluminum perimeter band thus provides an electrical/conductive raceway along the perimeter region, wherein the aluminum band (being closer to the glass surface and either on the glass surface or overcoating the likes of an ITO layer on the glass surface so as to be what is seen when a driver or occupant of the vehicle views the reflective element when it is mounted in or on the vehicle) provides the desired appearance and enhances the electrical conductivity and the chromium overcoating layer provides environmental protection to the aluminum band and further enhances electrical conductivity.

Optionally, other materials or compositions may be used for the perimeter band to achieve the desired appearance and the desired conductivity and environmental stability. For example, a silver or silver alloy or aluminum or aluminum alloy band (or other material which may be less reflective but more corrosive resistant than silver or aluminum, such as the materials listed above, as desired) may be disposed onto the transparent conductive coating and along the unmasked perimeter region of the substrate, and a chromium layer (or other material such as those listed above) may be disposed thereon. Optionally, the perimeter band may comprise a single layer (such as silver or aluminum or their alloys or the like), and may not have any chromium or other more corrosive resistant metallic overlay disposed thereon. The transparent conductive coating may be applied to the glass surface first, before the perimeter band, or the perimeter band metallic reflective material may be applied or disposed or established onto the glass perimeter surface, with the transparent conductive coating disposed over the perimeter band material, such as described in U.S. patent application Ser. No. 11/021,065, filed Dec. 23, 2004 by McCabe et al. for ELECTRO-OPTIC MIRROR CELL, now U.S. Pat. No. 7,255,451; and/or PCT Application No. PCT/US04/43500, filed Dec. 23, 2004 by Donnelly Corp. et al. for ELECTRO-OPTIC MIRROR CELL, which are all hereby incorporated herein by reference.

In applications where the transparent conductive coating is disposed on the second surface of the front substrate and the perimeter band is disposed around the perimeter region of the substrate and over the transparent conductive coating, the color or appearance of the perimeter band, as seen from the front of the reflective element and viewing through the front substrate, may be affected by the optical thickness and/or refractive index of the transparent conductive coating. Thus, the selected thickness of the transparent conductive coating may affect the resistance across the substrate surface (and thus may affect the performance of the electrochromic reflective element or cell), and may also affect the appearance of the perimeter band. The appearance and performance of the reflective element thus may be linked by the selected thickness of the transparent conductive coating. For example, if a particular or desired appearance or color of the perimeter band requires a thinner transparent conductive coating, and hence somewhat less electrically conductive layer (such as, for example, about 1000 Angstroms to about 1200 Angstroms physical thickness or thereabouts ITO with a sheet resistance in the about 18 ohms per square to about 20 ohms/square or thereabouts range) between the perimeter band and the rear or second surface of the front substrate, the transparent conductive coating may be disposed on the substrate surface at the selected thickness and the perimeter band material may be disposed around the perimeter region and over the transparent conductive coating (such as described in U.S. patent application Ser. No. 11/021,065, filed Dec. 23, 2004 by McCabe et al. for ELECTRO-OPTIC MIRROR CELL, now U.S. Pat. No. 7,255,451; and/or PCT Application No. PCT/US04/43500, filed Dec. 23, 2004 by Donnelly Corp. et al. for ELECTRO-OPTIC MIRROR CELL, which are hereby incorporated herein by reference). If the selected thickness of the initially deposited transparent conductive coating does not achieve the desired sheet resistance at the substrate surface, a second transparent conductive coating may be disposed over the perimeter band and over the first transparent conductive coating to achieve the desired thickness and sheet resistance of the transparent conductive coatings on the substrate surface (but because this second transparent conductive layer is now over the metallic perimeter band, it does not effect the interference color established by the initially deposited transparent conductor layer that is between the substrate surface and the metallic perimeter band).

If it is desired to avoid or reduce the linkage affect of the transparent conductive coating and the appearance and performance of the reflective element, the metallic perimeter band material may be disposed onto the substrate surface (before the transparent conductive coating is disposed onto the substrate surface) and around the perimeter edge region, and the transparent conductive coating may be disposed over the perimeter band and over the rest of the substrate surface at the desired or appropriate thickness. In such an application, the color of the perimeter band may be silvery or neutral, since it is the metallic perimeter band reflector that is coated directly onto the second surface of the front substrate in the EC cell (without the transparent conductor coating between it and the glass surface so that the transparent conductor coating does not cause any interference color be imparted to the reflection off the metal perimeter band), and so it will be substantially the color of the metal material (such as chromium or aluminum or the like) that is used to create the perimeter band reflector.

Optionally, if it is desired to have a different color or different appearance of the perimeter band, the perimeter band metallic material may be disposed in a vacuum deposition or sputter coating chamber, and an oxide or nitride or the like may be introduced into the chamber during the sputter coating process. The introduced composition may be selected to provide the desired color or appearance or interference effect to the perimeter band. For example, the perimeter band may comprise titanium, and nitrogen or oxygen or other gas may be introduced into the chamber during the sputter coating process to achieve a titanium oxide perimeter band. If desired, a chromium layer may be disposed over the titanium oxide perimeter band to enhance the conductivity of the perimeter band as described above. The introduced composition or material and the metallic perimeter band material may be selected to provide the desired color or appearance or interference effect to the perimeter band, Whereby the transparent conductive coating or layer will have a reduced or minimal affect on the color or appearance of the perimeter band.

The appearance of the perimeter band is thus dictated by the material that is contacting the second or rear surface of the front substrate. Once an initial layer is established, other layers of material may be coated over the initial layer at the perimeter band region, whereby the interference effect of the initial layer will dictate the appearance of the perimeter band as viewed from the front of the mirror reflective element and through the front substrate. A potential disadvantage of having the metallic perimeter band over the transparent conductive coating (where the transparent conductive coating is between the perimeter band and the second surface of the front substrate), is that the color that may be created by the interference effect of the transparent conductive coating and the perimeter band material can affect the sheet resistance of the transparent conductive coating. This can be overcome by disposing the perimeter band metallic material onto the substrate surface and before the conductive coating is deposited onto the substrate. However, if a different color or interference affect is desired, other means for adjusting or changing or affecting the interference effect may be implemented, such as introducing oxygen or nitrogen or other gasses into the sputter chamber during the initial deposition of the metallic material of the perimeter band, or depositing or disposing a layer or layers of other materials at the glass surface, in order to achieve the desired interference effect, without affecting the sheet resistance of the transparent conductive coating.

Optionally, one or more layers of different materials may be disposed or stacked at the perimeter band region and between the metallic band material and the rear surface of the front substrate to provide the desired color or appearance of the perimeter band. For example, different materials having different refractive indices may be disposed at the perimeter region to provide the desired effect on the appearance of the perimeter band. Suitable high refractive index materials may include titanium dioxide or the like, while low refractive index materials may include silicon oxide or the like. The materials and thicknesses of the coatings or layers thus may be selected and combined or stacked to provide the desired color and appearance of the perimeter band.

Other materials thus may be selected to create the perimeter band in order to achieve the desired color or appearance of the perimeter band. For example, if a duller or less reflective appearance is desired, chromium may be deposited or sputtered onto the perimeter band region, and nitrogen or oxygen or other gasses or combinations or the like may be introduced into the sputter chamber during the sputtering process to provide a perimeter band of chromium oxide or the like, which may have reduced reflectivity of light incident thereon. The nitrogen or oxygen or the like may be bled into the sputter chamber to achieve the desired appearance or color, and, if desired or appropriate, chromium or the like may be applied or disposed over the chromium oxide (or the like) band to establish the desired conductivity of the perimeter band.

Desirably, the nitrogen or oxygen or the like may be introduced into the sputter chamber during the initial deposition of the chromium to establish a chromium oxide layer on the substrate surface (or on the transparent conductive coating at the substrate surface), and the supply of nitrogen or oxygen or the like to the sputter chamber may be reduced or stopped, so that a metallic layer of substantially pure (with reduced nitrogen or oxygen content) chromium (or other suitable metal material or alloy or composition) may be deposited over the chromium oxide layer. The chromium oxide layer thus may provide the desired appearance or color or interference effect to the perimeter band, while the substantially pure layer provides the desired conductivity along the perimeter band. Optionally, the use of an achromatic or neutral reflective metallic material, such as chromium, rhodium, tungsten, nickel, molybdenum, iron, titanium, stainless steel and/or alloys thereof, may be deposited at the perimeter region to provide the desired appearance and reflectivity.

Optionally, different metallic materials may be deposited at the perimeter band region of the substrate to provide a desired appearance or color and functionality. For example, a thin layer of rhodium (such as about 200 Angstroms physical thickness) may be deposited on the perimeter region of the substrate surface to provide a shiny or highly reflective appearance of the perimeter band as seen form the front of the substrate viewing through the substrate thickness. A layer of chromium (such as about 800 to 1000 Angstroms physical thickness) may be deposited over the first layer of rhodium to provide the desired electrical conductivity of the conductive perimeter band or raceway. A second layer of rhodium (such as about 200 Angstroms physical thickness) may then be deposited over the chromium band layer to provide a reduced oxidation effect at the third layer, upon which a conductive epoxy (or other suitable material) may be dispensed, as described above. The multiple layers thus achieve the desired appearance and functionality, without the higher costs that may be associated with depositing a thick layer or band of rhodium or the like. Although described as three layers of rhodium and chromium, trilayers or multiple layer stacks of other materials and other thicknesses may be implemented for the perimeter band, without affecting the scope of the present invention.

Optionally, the deposition conditions during the deposition of the materials may be adjusted to alter or adjust the qualities or characteristics of the perimeter band. For example, the chromium band may be deposited at a high vacuum low in partial pressure of the likes of oxygen, nitrogen or water (such as a vacuum pressure higher than about $1 \times 10^{-4}$ torr vacuum pressure) to provide enhanced conductivity of the chromium band or layer.

In such an application where the perimeter band may have reduced reflectivity of light incident thereon, the reflective element may not rely on the border or perimeter region to provide the required field of view area of reflectivity, such as required by FMVSS 111 or European Directive 2003/97/EC. Typically, the reflectivity of the mirror reflective element is at least about 35 percent reflectivity of light incident thereon (such as measured in accordance with SAE J964A). If the perimeter region is not being relied on to achieve the required field of view area, the perimeter band may be disposed to have a reduced reflectivity if desired. If the perimeter band is required to meet the minimum reflectivity requirements, the perimeter band material or composition may be selected to provide the required reflectivity of light incident thereon (such as at least 35% reflectivity of light incident thereon for U.S. mirrors and/or at least 40 percent reflectivity of light incident thereon for European applications). Also, it is preferable that the reflectivity of the perimeter band be greater than at least 50% R so as to satisfy automaker internal specification such as the SDS requirement form Ford Motor Company of Detroit, Mich. In this regard, we find that depositing a metallic perimeter band (such as of chromium or of rhodium or of aluminum or an alloy thereof by sputter deposition in a high vacuum pressure) first onto the rear (second) surface of the front substrate and depositing the transparent coating over the already deposited metallic perimeter reflector layer is best as this avoids the transparent conductor layer reducing (such as by light interference and/or by light absorption) reflection off the metallic reflector band (as viewed through the thickness of the front substrate via its first surface). With suitable choice of reflective material (such as of rhodium or aluminum or silver, or their alloys), a reflectivity off the perimeter reflector band on the rear (second) surface of the front substrate in excess of about 55% R can be achieved band (as viewed through the thickness of the front substrate via its first surface).

The material or materials and/or composition of the perimeter band (and whether the transparent conductor coating is over or under it) thus may be selected to provide the desired color or appearance and conductivity and reflectivity at the rear surface of the front substrate. The reflective element thus may be tuned or balanced, so that the conductivity of the perimeter band is balanced with the second surface transparent conductive coating, without affecting the color or appearance of the perimeter band and thus of the reflective element. The reflective element may also be balanced or tuned by the material and thicknesses of the third surface conductive coating to compensate or ameliorate the affects of different thicknesses of the transparent conductive coating (such as ITO or the like) on the appearance of the reflective element.

Optionally, the reflective element assembly may comprise curved or bent substrates (such as for exterior rearview mirror assemblies), and may comprise aspheric substrates to provide an enhanced field of view rearward. In such applications, the reflective element assembly may include a demarcation line or means (such as a dashed line or dots or the like) formed in the reflective coating or layers that typically comprise the third surface reflector/conductor in the twin substrate laminate electrochromic cell construction. This demarcation line or means is typically conveniently established by using a laser to etch away the coating at an outboard region of the rear substrate metallic coating so that the demarcation line (for example, dashes or dots) runs generally vertically from the top to the bottom of the electrochromic mirror (and is disposed at or near an outboard portion thereof) when the EC mirror is ultimately mounted on the exterior of its intended vehicle. The demarcation line or means demarcates the outer, more sharply curved, lower radius of curvature aspheric region from the inboard (typically convex curvature) main viewing portion of the electrochromic rearview mirror. Because the perimeter band is at the second surface of the reflective element assembly, it may hide or conceal the upper and lower ends or end portions of the demarcation line established in the reflective coating or coatings on the third surface of the reflective element assembly. Optionally, the perimeter coating or band of the second surface of the front substrate may be etched with similar dots or dashes (or the like) so that this etching matches the demarcation line established on the third surface metallic reflector. This demarcation portion of the perimeter coating on the second surface is established at an upper portion of the band and at a lower portion of the band that will coincide with, and generally run coincident with, the demarcation line established on the third surface metallic reflector when the front and rear substrates are juxtaposed to form the electrochromic reflective element assembly. Accordingly, when the front substrate, with the perimeter band so demarcated, and the rear substrate, with the demarcation line established across its third surface reflective surface, are juxtaposed and mated together, and after the reflective element is mounted on the vehicle, the driver of the vehicle views the demarcation line to continue generally uninterrupted from the central viewing region out (via the demarcated lines/portions of the perimeter band) to the top edge and bottom edge of the electrochromic mirror element as it is mounted on the vehicle.

Therefore, the perimeter band may include a portion of the demarcation line formed thereon, such as described in U.S. patent application Ser. No. 11/021,065, filed Dec. 23, 2004 by McCabe et al. for ELECTRO-OPTIC MIRROR CELL, now U.S. Pat. No. 7,255,451; and/or PCT Application No. PCT/US04/43500, filed Dec. 23, 2004 by Donnelly Corp. et al. for ELECTRO-OPTIC MIRROR CELL, which are all hereby incorporated herein by reference. Optionally, the demarcation line or lines or line portions may be formed in the perimeter band and/or in the third surface reflective coating after the substrates are mated together. Dots or dashes, or similar non-continuous demarcation lines or segments or portions, are preferred so that electrical conductivity is preserved between the dots and dashes established, for example, in the metallic perimeter band. For example, the demarcation line may be formed by laser ablating the reflective coatings from the second and third surfaces. Any tiny contaminants that may be present after the laser ablation process may be dispersed via a heating process. The laser ablation may occur before or after the reflective element assembly or cell is filled with the electro-optic medium.

The present invention can be utilized in a variety of interior and exterior mirror assemblies such as described above. Also, the metallic and conductive mirror reflector on the inward facing surface (third surface) of an electrochromic (EC) mirror cell of the present invention may be a transflective "display on demand" layer or stack of coatings that is both reflecting of and transmitting to incident light, such as is disclosed in U.S. Pat. No. 5,668,663, which is hereby incorporated herein by reference. Also, and as disclosed in the '663 patent incorporated above, a turn signal indicator such as an LED indicator may be mounted behind an interior or an exterior mirror reflector of the present invention that utilizes a transflective mirror reflector, so that the presence of the turn signal indicator behind the mirror cell element is largely unseen until the turn signal is powered to illuminate and indicate a turn event. In this regard, when a transflective "display on demand" exterior electrochromic mirror (such as is disclosed in the '663 patent incorporated above) is used as a driver-side exterior rearview mirror on a vehicle, it can be advantageous to utilize a non-electrochromic, non-electrically-dimming transflective mirror on the corresponding passenger-side with a through-the-reflector turn signal indicia also. In this regard, use of an elemental semiconductor mirror, such as a silicon metal mirror, such as disclosed in U.S. Pat. Nos. 5,535,056; 5,751,489; and 6,065,840, which are hereby incorporated herein by reference, can be advantageous because such elemental semiconductor mirrors (such as can be formed by depositing a thin film of silicon) can be greater than 50% reflecting in the photopic (SAE J964a measured), while being also substantially transmitting of light (up to 20% or even more). Such silicon mirrors also have the advantage of being able to be deposited onto a flat glass substrate and to be bent into a curved (such as a convex or aspheric) curvature, which is also advantageous since many passenger-side mirrors are bent or curved.

Although shown and described as being a reflective element assembly for an exterior rearview mirror assembly of a vehicle, the reflective element assembly may optionally be implemented with an interior rearview mirror assembly, without affecting the scope of the present invention. Optionally, the reflective element assembly may be received within a bezel portion or assembly of a rearview mirror assembly, whereby the bezel portion or assembly may attach to a desired or selected rear cap portion or end cap to form or assemble a mirror assembly having the desired accessory or accessories or mirror content, such as is described in PCT Application No. PCT/US2004/015424, filed May 18, 2004 by Donnelly Corp. et al. for MIRROR ASSEMBLY FOR VEHICLE, which is hereby incorporated herein by reference. In such an application, the mirror mount may attach to the reflective element assembly and the back or cap portion may attach to the rear of the bezel assembly (as described in PCT Application No. PCT/US2004/015424, filed May 18, 2004 by Donnelly Corp. et al. for MIRROR ASSEMBLY FOR VEHICLE, which is hereby incorporated herein by reference).

Optionally, the mirror assembly, such as an interior rearview mirror assembly, may include a display element or display system for displaying information at the reflective element for viewing by a driver of the vehicle. The display may utilize aspects or characteristics of various displays, such as the types described in such as described in U.S. Pat. Nos. 6,329,925 and 6,501,387, which are hereby incorporated herein by reference, or such as display on demand types of display, such as of the types described in commonly assigned U.S. Pat. Nos. 6,690,268; 5,668,663 and 5,724,187, and/or in U.S. patent application Ser. No. 10/054,633, filed Jan. 22, 2002 by Lynam et al. for VEHICULAR LIGHTING SYSTEM, now U.S. Pat. No. 7,195,381; and/or Ser. No. 10/528, 269, filed Mar. 17, 2005, now U.S. Pat. No. 7,274,501, and/or in PCT Application No. PCT/US03/29776, filed Sep. 19, 2003 by Donnelly Corp. et al. for ELECTROCHROMIC MIRROR ASSEMBLY, which are all hereby incorporated herein by reference, or other types of displays, such as the types described in U.S. patent application Ser. No. 10/956, 749, filed Oct. 1, 2004 by Schofield et al. for MIRROR REFLECTIVE ELEMENT ASSEMBLY INCLUDING ELECTRONIC COMPONENT; Ser. No. 10/993,302, filed Nov. 19, 2004 by Lynam for MIRROR REFLECTIVE ELEMENT FOR A VEHICLE, flow U.S. Pat. No. 7,338,177; Ser. No. 10/528,269, filed Mar. 17, 2005, now U.S. Pat. No. 7,274, 501; Ser. No. 10/533,762, filed May 4, 2005, now U.S. Pat. No. 7,184,190; Ser. No. 11/226,628, filed Sep. 14, 2005; and/or Ser. No. 10/225,851, filed Aug. 22, 2002 by Burgner for VEHICLE INFORMATION DISPLAY, now U.S. Pat. No. 6,847,487, and/or PCT Application No. PCT/US03/ 29776, filed Sep. 19, 2003 by Donnelly Corp. et al. for ELECTROCHROMIC MIRROR ASSEMBLY; PCT Application No. PCT/US03/35381, filed Nov. 5, 2003 by Donnelly Corp. et al. for ELECTRO-OPTIC REFLECTIVE ELEMENT ASSEMBLY; and/or PCT Application No. PCT/US03/ 40611, filed Dec. 19, 2003 by Donnelly Corp. et al. for ACCESSORY SYSTEM FOR VEHICLE; and/or U.S. provisional applications, Ser. No. 60/642,227, filed Jan. 7, 2005 by Karner et al. for MOUNTING ASSEMBLY FOR MIRROR AND METHOD OF MAKING SAME; and/or Ser. No. 60/607,963, filed Sep. 8, 2004 by Schofield for IMAGING SYSTEM FOR VEHICLE; Ser. No. 60/732,245, filed Nov. 1, 2005; and/or Ser. No. 60/759,992, filed Jan. 18, 2006, which are all hereby incorporated herein by reference in their entireties.

Optionally, the display may comprise a laser emitter or laser diode or the like, which may be positioned within the mirror casing and behind the reflective element, and may be used to emit radiation onto a reflector (such as a microelectromechanical scanner (MEMS)) within the mirror casing that reflects the radiation toward and through the mirror reflective element for viewing by a driver of the vehicle (such as by utilizing aspects described in U.S. patent application Ser. No. 10/225,851, filed Aug. 22, 2002 by Burgner for VEHICLE INFORMATION DISPLAY, now U.S. Pat. No. 6,847,487; and/or Ser. No. 11/226,628, filed Sep. 14, 2005; and/or U.S. provisional applications, Ser. No. 60/642,227, filed Jan. 7, 2005 by Karner et al. for MOUNTING ASSEMBLY FOR MIRROR AND METHOD OF MAKING SAME; and/or Ser. No. 60/607,963, filed Sep. 8, 2004 by Schofield for IMAGING SYSTEM FOR VEHICLE, which are hereby incorporated herein by reference).

The light emitting device, such as a laser diode or light emitting diode (LED) or the like (such as described in U.S. patent application Ser. No. Ser. No. 11/226,628, filed Sep. 14, 2005; and U.S. provisional applications, Ser. No. 60/642,227, filed Jan. 7, 2005 by Karner et al. for MOUNTING ASSEMBLY FOR MIRROR AND METHOD OF MAKING SAME; and/or Ser. No. 60/607,963, filed Sep. 8, 2004 by Schofield for IMAGING SYSTEM FOR VEHICLE, which are hereby incorporated herein by reference), of the display may be controlled by a controller, which may modulate the intensity or on/off characteristic of the emitted light while the light emitting device or laser is rastered (or moved rapidly back and forth in generally horizontal or vertical scanning lines over a display area), in order to create the desired display via the points where the light emitting device is intensified or activated. Because the laser diode may be rastered at a high rate over substantially the entire display area but only activated/ intensified at appropriate locations to form the desired display, the narrow point like, super high intensity beam (that is activated/intensified/modulated as the laser diode is rapidly moved across the display image dimension at a rate that is faster than the eye/brain can register) is perceived by the human eye/brain as a continuous (or substantially continuous) super bright image, even though only one light "dot" or beam may actually be present at a time at the display. A person viewing the display thus would see the display as the desired form or character and substantially constantly and brightly illuminated by the rastered and modulated laser diode.

Optionally, the light emitting device may be substantially constantly activated and directed/rastered toward a display window, such as a liquid crystal display (LCD) or the like, with a window established in the desired form, so that light emitted by the light emitting device (such as a laser diode, a light emitting diode (LED) or an organic light emitting diode (OLED) or the like) projects or shines through the display window/element, such that the display character or icon or information or video or the like is viewable at the reflective element by the driver of the vehicle. The display window may comprise a substantially transparent or translucent shape or character or icon or the like, with a darkened or substantially opaque area surrounding the window, such that light emitted by the light emitting device passes through or transmits through the window, but is substantially blocked or attenuated by the surrounding opaque area of the display. The LCD display may be operable to adjust the window and opaque regions to adjust or modulate or change or control the information being displayed by the light passing through the display. For applications where the light emitting device may be rastered at a high rate over substantially the entire display area (such as over the LCD), and with the illumination beam (such as the narrow point like, super high intensity beam of a laser emitting device) rapidly moving across the display image dimension at a rate that is faster than the eye/brain can register, the eye/brain perceives a continuous (or substantially continuous) bright image, even though only one light "dot" or beam may be present at a time through the display window. The light emitting device thus may be constantly or substantially constantly activated/energized, with the display being formed/created by the window through which the light passes as the light beam is rastered or scanned over the display device. A person viewing the display thus would see the display as the character of the display window as substantially constantly and brightly illuminated by the rastered laser diode or other light emitting device, such as an LED or OLED or the like.

Optionally, a projected information display and/or virtual human machine interface (HMI) may be created at a surface of an interior mirror assembly or a windshield electronics module/accessory module utilizing a virtual data entry device system, such as is disclosed in U.S. Pat. Pub. No. 20020075240, published Jun. 20, 2002, which is hereby incorporated herein by reference. Thus, an optically generated image of a key-entry tablet or an input menu or user-actuation button/input or an icon or an informational message or the like can be projected, for example, onto a surface of the interior rearview mirror or elsewhere within the cabin of the vehicle. The projected image may include at least one input zone/user interface zone that is actuatable by an action performed thereon or thereat by a user. The system includes a sensor operative to sense the action performed on or at the at least one input zone, and to generate signals in response to the detected action. A control or processor in communication with the sensor is operable to process the signals for performing an operation associated with the at least one input zone.

For example, a template of the desired interface (such as a keyboard or input options or the like) may be projected onto an interface surface (such as the reflective element of the interior mirror assembly). The template is produced by illuminating an optical element (such as a holographic optical element) with a laser diode (such as a red laser diode or the like). Because the template functions only as a reference for the user and is not involved in the detection process, the template may optionally be printed at a desired surface, such as at a portion of the reflective element or casing of the mirror assembly (or at a casing or element of a windshield electronics module or accessory module or the like).

An infrared plane of light may be generated at and slightly spaced from and parallel to the interface surface. The light may be substantially invisible to the use and is positioned just a few millimeters away from the interface surface (such as along the first surface of the reflective element and a few millimeters toward the driver or toward the rear of the vehicle from the first surface of the reflective element). Accordingly, when a user touches a portion of the projected interface at the interface surface (for example, the first surface of the reflective element of the interior mirror assembly), light is reflected from the plane in the vicinity of the respective input or key that was "touched" and directed toward the sensor module.

The reflected light from the user interaction with the interface surface is received by or imaged onto an imaging array sensor, such as a CMOS image sensor or the like, in a sensor module. The reflected light may pass through an infrared filter before being imaged onto the CMOS sensor. The sensor control or processor or chip then may conduct a real-time determination of the location of the reflected light, and may be operable to track multiple reflection events substantially simultaneously, and can thus support both multiple inputs/keystrokes and overlapping cursor control inputs and the like. The micro-controller (which may be positioned in the sensor module) receives the positional information corresponding to the light flashes from the sensor control or processor, and interprets the events and communicates them through an appropriate interface to the appropriate external device or devices.

The projected interface and sensor system thus may provide a keypad or input interface at the reflective element for actuation/use by the driver or occupant of the vehicle. The keypad or input interface may be projected onto or at the reflective element only when it is desired to be used, such that the reflective element is substantially unaffected by the incorporation of the interface and sensor system at the interior rearview mirror assembly. The sensor may detect the input action performed/selected by the user and the control may then control or activate/deactivate or modulate or adjust the appropriate accessory or system or device of the vehicle.

The information or input interface that is projected may provide various inputs/actions, such as, for example, inputs for a video display of the vehicle (such as disclosed in U.S. Pat. Nos. 5,760,962 and/or 5,877,897; and/or PCT Application No. PCT/US03/40611, filed Dec. 19, 2003 by Donnelly Corp. et al. for ACCESSORY SYSTEM FOR VEHICLE, and/or U.S. patent application Ser. No. 11/284,543, filed Nov. 22, 2005; and/or Ser. No. 11/239,980, filed Sep. 30, 2005; and/or U.S. provisional applications, Ser. No. 60/630,061, filed Nov. 22, 2004 by Lynam et al. for MIRROR ASSEMBLY WITH VIDEO DISPLAY; Ser. No. 60/628,709, filed Nov. 17, 2004 by Camilleri et al. for IMAGING AND DISPLAY SYSTEM FOR VEHICLE; Ser. No. 60/614,644, filed Sep. 30, 2004; and/or Ser. No. 60/618,686, filed Oct. 14, 2004 by Laubinger for VEHICLE IMAGING SYSTEM, which are hereby incorporated herein by reference), a communications system of the vehicle (such as disclosed in U.S. Pat. Nos. 6,717,524; 6,650,233; 6,243,003; 6,278,377; and/or 6,420,975, and/or PCT Application No. PCT/US03/30877, filed Oct. 1, 2003, which are hereby incorporated herein by reference), a navigational system of the vehicle (such as the types described in U.S. Pat. No. 6,477,464, and U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593; Ser. No. 10/287,178, filed Nov. 4, 2002 by McCarthy et al. for NAVIGATION SYSTEM FOR A VEHICLE, now U.S. Pat. No. 6,678,614; Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; and Ser. No. 10/422,378, filed Apr. 24, 2003, now U.S. Pat. No. 6,946,978; and/or PCT Application No. PCT/US03/40611, filed Dec. 19, 2003 by Donnelly Corporation et al. for ACCESSORY SYSTEM FOR VEHICLE, which are hereby incorporated herein by reference), light sources (such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; and/or 5,669,698, and/or U.S. patent application Ser. No. 10/054,633, filed Jan. 22, 2002 by Lynam et al. for VEHICULAR LIGHTING SYSTEM, now U.S. Pat. No. 7,195,381, which are hereby incorporated herein by reference) and/or the like. Optionally, different interfaces may be provided for different accessories or devices or functions, whereby the appropriate interface for a particular accessory or device or function may be selected by the user, and the desired particular function of that accessory or device may then be selected and activated or deactivated or controlled by "touching" the appropriate location at the surface (such as the first surface of the reflective element) upon which the interface keypad or input is projected.

Optionally, the interface projector may be positioned at an overhead location, such as at an eyebrow location of the mirror assembly or elsewhere at the bezel of the mirror assembly, and may project the projected interface display at the first surface of the reflective element of the mirror assembly. Optionally, the projector may be positioned within the mirror and behind the reflective element, and thus may project the interface/display through the reflective element for viewing at the reflective element of the mirror assembly (where the mirror reflective element may comprise a transflective reflective element, such as an electro-optic transflective reflective element of the types described in U.S. Pat. Nos. 6,690,268; 5,668,663 and/or 5,724,187, and/or in U.S. patent application Ser. No. 10/054,633, filed Jan. 22, 2002 by Lynam et al. for VEHICULAR LIGHTING SYSTEM, now U.S. Pat. No. 7,195,381; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 11/284,543, filed Nov. 22, 2005; and/or Ser. No. 11/021,065, filed Dec. 23, 2004 by McCabe et al. for ELECTRO-OPTIC MIRROR CELL, now U.S. Pat. No. 7,255,451; and/or PCT Application No. PCT/US04/43500, filed Dec. 23, 2004 by Donnelly Corp.

et al. for ELECTRO-OPTIC MIRROR CELL; and/or PCT Application No. PCT/US03/29776, filed Sep. 9, 2003 by Donnelly Corp. et al. for MIRROR REFLECTIVE ELEMENT ASSEMBLY; and/or PCT Application No. PCT/US03/35381, filed Nov. 5, 2003 by Donnelly Corp. et al. for ELECTRO-OPTIC REFLECTIVE ELEMENT ASSEMBLY; and/or U.S. provisional application Ser. No. 60/630,061, filed Nov. 22, 2004 by Lynam et al. for MIRROR ASSEMBLY WITH VIDEO DISPLAY; and/or PCT Application No. PCT/US03/40611, filed Dec. 19, 2003 by Donnelly Corp. et al. for ACCESSORY SYSTEM FOR VEHICLE, which are hereby incorporated herein by reference, or a prismatic transflective reflective element such as the types described in PCT Application No. PCT/US03/29776, filed Sep. 19, 2003 by Donnelly Corp. et al. for MIRROR REFLECTIVE ELEMENT ASSEMBLY; U.S. patent application Ser. No. 10/528,269, filed Mar. 17, 2005, now U.S. Pat. No. 7,274,501; Ser. No. 10/993,302, filed Nov. 19, 2004 by Lynam for MIRROR REFLECTIVE ELEMENT FOR A VEHICLE, now U.S. Pat. No. 7,338,177; and/or Ser. No. 11/021,065, filed Dec. 23, 2004 by McCabe et al. for ELECTRO-OPTIC MIRROR CELL, now U.S. Pat. No. 7,255,451; and/or PCT Application No. PCT/US04/43500, filed Dec. 23, 2004 by Donnelly Corp. et al. for ELECTRO-OPTIC MIRROR CELL, which are all hereby incorporated herein by reference). The sensor may then detect the presence of the user's finger (or other object or pointer) at the first surface of the reflective element and at the projected interface.

Optionally, the minor assembly may include one or more accessories, such as one or more accessories incorporated onto a printed circuit board or positioned elsewhere at or within the mirror casing or at or within an accessory module or windshield electronics module associated with the interior rearview mirror assembly. For example, the accessory or accessories may include one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot or object detection system, such as imaging or detection or indicating systems of the types disclosed in U.S. Pat. Nos. 5,929,786 and/or 5,786,772, and/or U.S. patent application Ser. No. 11/239,980, filed Sep. 30, 2005; and/or Ser. No. 10/427,051, filed Apr. 30, 2003 by Pawlicki et al. for OBJECT DETECTION SYSTEM FOR VEHICLE, now U.S. Pat. No. 7,038,577, and/or U.S. provisional applications, Ser. No. 60/696,953, filed Jul. 6, 2005; Ser. No. 60/628,709, filed Nov. 17, 2004 by Camilleri et al. for IMAGING AND DISPLAY SYSTEM FOR VEHICLE; Ser. No. 60/614,644, filed Sep. 30, 2004; Ser. No. 60/618,686, filed Oct. 14, 2004 by Laubinger for VEHICLE IMAGING SYSTEM; Ser. No. 60/638,687, filed Dec. 23, 2004 by Higgins-Luthman for OBJECT DETECTION SYSTEM FOR VEHICLE, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093; U.S. patent application Ser. No. 11/105,757, filed Apr. 14, 2005; and/or U.S. provisional applications, Ser. No. 60/607,963, filed Sep. 8, 2004 by Schofield for IMAGING SYSTEM FOR VEHICLE; and Ser. No. 60/562,480, filed Apr. 15, 2004 by Schofield for IMAGING SYSTEM FOR VEHICLE, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897; and/or PCT Application No. PCT/US03/40611, filed Dec. 19, 2003 by Donnelly Corp. et al. for ACCESSORY SYSTEM FOR VEHICLE, and/or U.S. provisional applications, Ser. No. 60/630,061, filed Nov. 22, 2004 by Lynam et al. for MIRROR ASSEMBLY WITH VIDEO DISPLAY, a remote keyless entry-receiver or system or circuitry and/or a universal garage door opening system or circuitry (such as the types disclosed in U.S. Pat. Nos. 6,396,408; 6,362,771; 5,798,688 and 5,479,155, and/or U.S. patent application Ser. No. 10/770,736, filed Feb. 3, 2004 by Baumgardner et al. for GARAGE DOOR OPENING SYSTEM FOR VEHICLE, now U.S. Pat. No. 7,023,322, microphones, such as disclosed in U.S. Pat. Nos. 6,717,524; 6,650,233; 6,243,003; 6,278,377; and/or 6,420,975, and/or PCT Application No. PCT/US03/30877, filed Oct. 1, 2003, speakers, a compass or compass system, such as disclosed in U.S. Pat. Nos. 5,924,212; 4,862,594; 4,937,945; 5,131,154; 5,255,442; and/or 5,632,092, and/or U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593; and/or Ser. No. 11/305,637, filed Dec. 16, 2005, now U.S. Pat. No. 7,329,013; and/or U.S. provisional application Ser. No. 60/636,931, filed Dec. 17, 2004 by Blank et al. for INTERIOR REARVIEW MIRROR SYSTEM WITH COMPASS, a tire pressure monitoring system, such as the types disclosed in U.S. Pat. Nos. 6,294,989; 6,445,287; and/or 6,472,979, and U.S. provisional application Ser. No. 60/611,796, filed Sep. 21, 2004 by O'Brien for TIRE PRESSURE ALERT SYSTEM, a seat occupancy detector, a vehicle occupancy detector, such as the type described in PCT Application No. PCT/US05/42504, filed Nov. 22, 2005, and provisional application Ser. No. 60/630,364, filed Nov. 22, 2004 by Wåhlström for OCCUPANT DETECTION SYSTEM FOR VEHICLE, a trip computer, a telematics system, such as an ONSTAR® system or the like, and/or any other desired accessory or system or the like (with all of the above-referenced patents and patent applications and PCT applications and provisional applications being commonly assigned to Donnelly Corporation, and with the disclosures of all of the above referenced patents and patent applications and PCT applications and provisional applications being hereby incorporated herein by reference in their entireties).

The accessory or accessories may be positioned at or within the mirror casing and may be included on or integrated in the printed circuit board positioned within the mirror casing, such as along a rear surface of the reflective element or elsewhere within a cavity defined by the casing, without affecting the scope of the present invention. The user interface and sensor system described above may be actuatable to control and/or adjust the accessories of the mirror assembly/system and/or an overhead console and/or an accessory module/windshield electronics module and/or the vehicle. The connection or link between the controls and the systems or accessories may be provided via vehicle electronic or communication systems and the like, and may be connected via various protocols or nodes, such as Bluetooth™, SCP, UBP, J1850, CAN J2284, FireWire 1394, MOST, LIN, FlexRay™, Byte Flight and/or the like, or other vehicle-based or in-vehicle communication links or systems (such as WIFI and/or IRDA) and/or the like, depending on the particular application of the mirror/accessory system and the vehicle. Optionally, the connections or links may be provided via wireless connectivity or links, such as via a wireless communication network or system, such as described in U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, which is hereby incorporated herein by reference, without affecting the scope of the present invention. Also, such accessories may be powered by direct connection to the vehicle wiring harness or by inductive coupling power into such accessories using electrical power inductive coupling methods known in the art, and such as are disclosed in U.S. Pat. Nos. 6,436,299 and 6,451,202 (the entire disclosures of which are hereby incorporated by reference herein).

Optionally, the mirror assembly may include a photo-sensor or light sensor or glare sensor at the mirror assembly for sensing the ambient light levels at or around the mirror and/or for sensing the light level or glare level from light (such as from headlights of a rearwardly approaching vehicle) rearward of the subject vehicle. Optionally, for example, a reflective element of the present invention (such as for an interior or exterior rearview mirror assembly) may include a photo sensor or light sensor (such as the types described in U.S. Pat. Nos. 6,831,268; 6,742,904; 6,737,629; 5,406,414; 5,253,109; 4,799,768; and 4,793,690, and U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, which are hereby incorporated herein by reference) at the rear or fourth surface of the reflective element, such that the photo sensor detects light passing through the reflective element. Examples of such configurations are described in U.S. Pat. Nos. 4,793,690; 5,550,677 and 5,193,029, and U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, which are all hereby incorporated herein by reference. The reflective element thus may have a window or transmissive port or portion at the photo sensor or, and preferably, may comprise a transflective display on demand (DOD) type reflective element or cell, such as, for example, the types described in U.S. Pat. Nos. 5,668,663; 5,724,187; and 6,690,268, and/or in U.S. patent application Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/054,633, filed Jan. 22, 2002 by Lynam et al. for VEHICULAR LIGHTING SYSTEM, now U.S. Pat. No. 7,195,381, and/or in PCT Application No. PCT/US03/29776, filed Sep. 19, 2003 by Donnelly Corp. et al. for ELECTROCHROMIC MIRROR ASSEMBLY, and/or PCT Application No. PCT/US03/35381, filed Nov. 5, 2003 by Donnelly Corp. et al. for ELECTRO-OPTIC REFLECTIVE ELEMENT ASSEMBLY, which are all hereby incorporated herein by reference. The transflective reflective element may have a fixed attenuation such that only a relatively small amount of light passes therethrough, such as about 12 to 25 percent of the light incident on the reflective element, such that the signal to dark current ratio generated at the sensor may be substantially reduced. Because the photo sensor may have a relatively small sensing area, the sensor may not receive or sense a substantial amount of light passing through the reflective element. Therefore, it is envisioned that a light concentrator (such as a lens and/or light channel and/or light pipe and/or other light concentrating device) may be positioned at the photo sensor to focus or direct the light passing through a larger area of the reflective element onto the smaller sensing area of the photo sensor, such as described in U.S. patent application Ser. No. 11/021,065, filed Dec. 23, 2004 by McCabe et al. for ELECTRO-OPTIC MIRROR CELL, now U.S. Pat. No. 7,255,451; and PCT Application No. PCT/US04/43500, filed Dec. 23, 2004 by Donnelly Corp. et al. for ELECTRO-OPTIC MIRROR CELL, which are hereby incorporated herein by reference.

Figure 10:
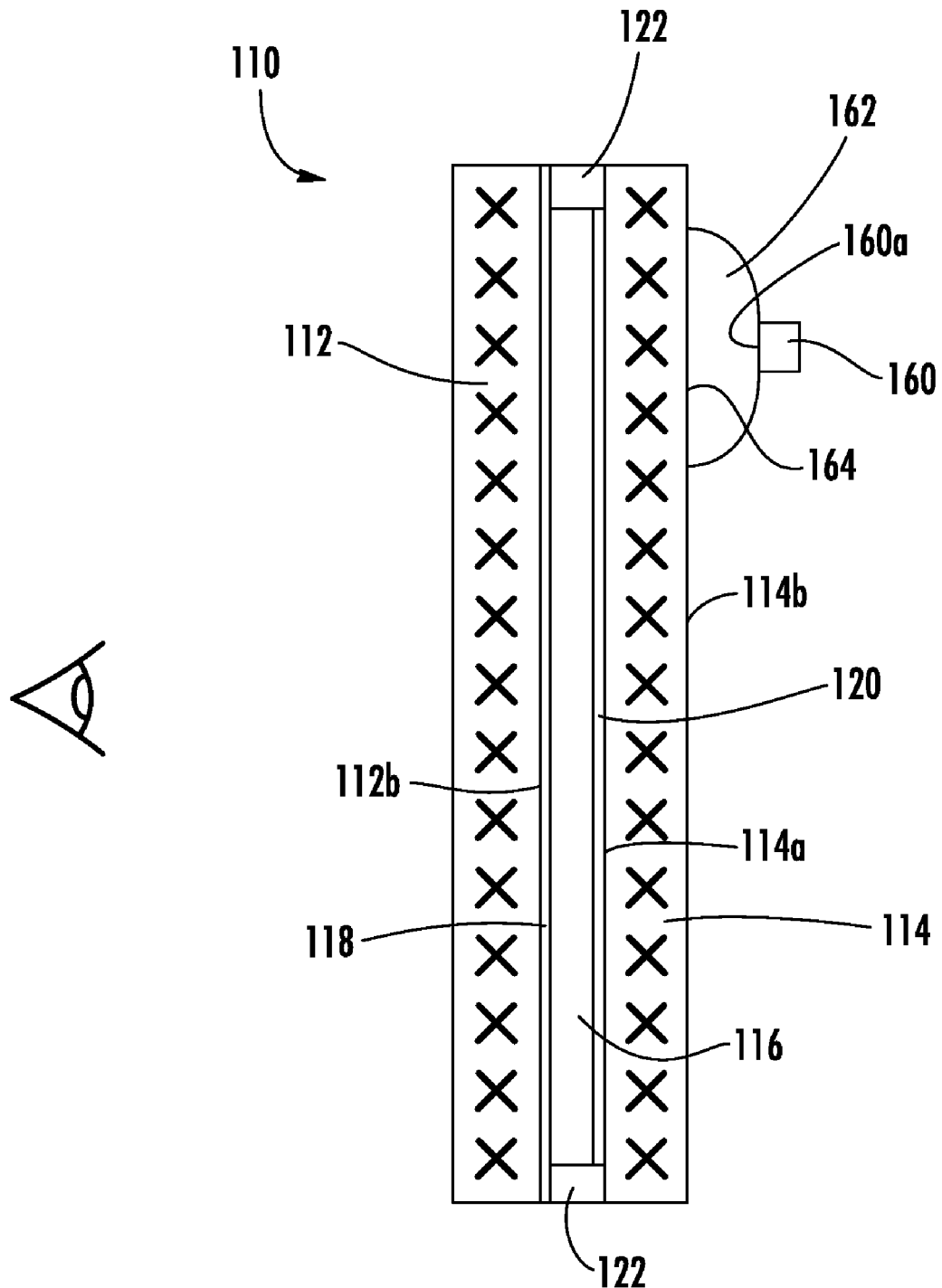
FIG. 10 is a sectional view of a reflective element assembly with a photo sensor and a light concentrating device in accordance with the present invention.

For example, and with reference to FIG. 10, a reflective element assembly 110 may include a front substrate 112 and a rear substrate 114 with an electro-optic or electrochromic medium 116 disposed or sandwiched therebetween and contained or surrounded or encompassed by a seal 122 around the perimeter of the electro-optic medium. The front substrate 112 includes a transparent electrically conductive layer or coating 118 on its rear or second surface 112b, while the rear substrate 114 includes a metallic electrically conductive and reflective layer 120 on its front or third surface 114a. The reflective element assembly comprises a transflective display on demand reflective element assembly, such that the reflective element is substantially reflective of light incident thereon, while also being at least partially transmissive of light therethrough. A photo sensor 160 is positioned at or behind the rear or fourth surface 114b of the rear substrate 114 for detecting light passing through the reflective element assembly, such as for detecting glare from the headlights of a rearward approaching vehicle. In the illustrated embodiment, the reflective element assembly includes a light directing or light focusing or light concentrating device 162 at the rear surface 114b of the rear substrate 114, such that the light concentrating device 162 directs or concentrates light onto the sensing surface 160a of the photo sensor 160.

The light concentrating device 162 functions to receive light passing through a portion or area or region 164 of the reflective element and concentrate the received light onto the smaller sensing surface 160a of the photo sensor 160. For example, the light concentrating device may concentrate light received from a larger region (such as a region having about a 5 mm to about a 10 mm or larger diameter) onto the smaller sensing area (such as a sensing area having about a 1 mm to about a 3 mm or smaller diameter), and thus may concentrate about 25 times more light, or more or less, onto the photo sensor. The light concentrating device thus provides a greater amount of light to the photo sensor such that the photo sensor may function to detect lower levels of light at the reflective element. The light concentrating device may comprise a lens or combination of lenses or other optical elements, a light channel, a compound parabolic collector, and/or a light pipe or other light concentrator, without affecting the scope of the present invention, and is configured to provide a field of view rearward of the vehicle that substantially replicates the field of view that is typical or conventional for glare sensing photo sensors in automatic dimming rearview mirror assemblies. For instance, a larger diameter lens may be disposed proximate to the rear surface (fourth surface) of the electrochromic reflective element or cell and another typically smaller diameter (and having a shorter focal length) lens may be set behind the first or larger lens to concentrate the light received by the larger diameter lens so that the light is concentrated and incident on the photo sensitive surface of the photo sensor. Preferably, in order to reduce cost and weight, such lenses and/or other optical elements used in the light concentrator, are fabricated from plastic, such as from an optical polymer, such as acrylic or polycarbonate or polystyrene or CR39 or COC olefin or the like. Preferably, the optic and/or light concentrating element is chosen such that it has reduced or minimal intrusiveness into the interior of the mirror head/housing so as to not crowd other features or items desired to be located or packaged therein.

For example, a funnel-shaped light concentrator, such as formed of a polymeric optical material, such as acrylic or polycarbonate or polystyrene or CR39 or COC olefin or the like, may be used that optically couples (such as via an optical adhesive) at its widest dimension/side to the rearmost surface of the electrochromic cell or reflective element, and that preferably optically couples at its narrow dimension/neck to the photo sensing surface of the photo sensor disposed at the narrow dimension/neck of the light concentrator. Optionally, the outer surfaces may be reflector coated so as to maximize light collection, and particularly off-axis light collection emanating from light sources, such as headlamps approaching from the rear of the vehicle. Such reflector coating may be a white diffuse reflective coating or a diffuser light reflector, such as a white paint or Argent paint or the like, or it may be a substantially specularly reflecting coating or layer, such as a metal thin film or layer, such as an aluminum or chromium metal reflecting thin layer or coating. Optionally, a hollowed cylinder or funnel can be used (such as a seashell-shaped funnel) that collects light over a broad area and that, having highly reflecting walls (such as can be achieved via vacuum metallization), reflects light backwards and forwards and channels the collected light to exit at its narrower neck so as to be incident at the photo detector disposed at the neck of the funnel. Optionally, and desirably, a near infrared filter (that attenuates/reduces infrared radiation) may be disposed along the optical path to the photo sensing surface of the photo sensor, such as behind the fourth surface of the mirror reflective element and in front of the photo sensing surface of the photo sensor, such as proximate to or immediately in front of the photo sensing surface of the photo sensor.

Figure 11:
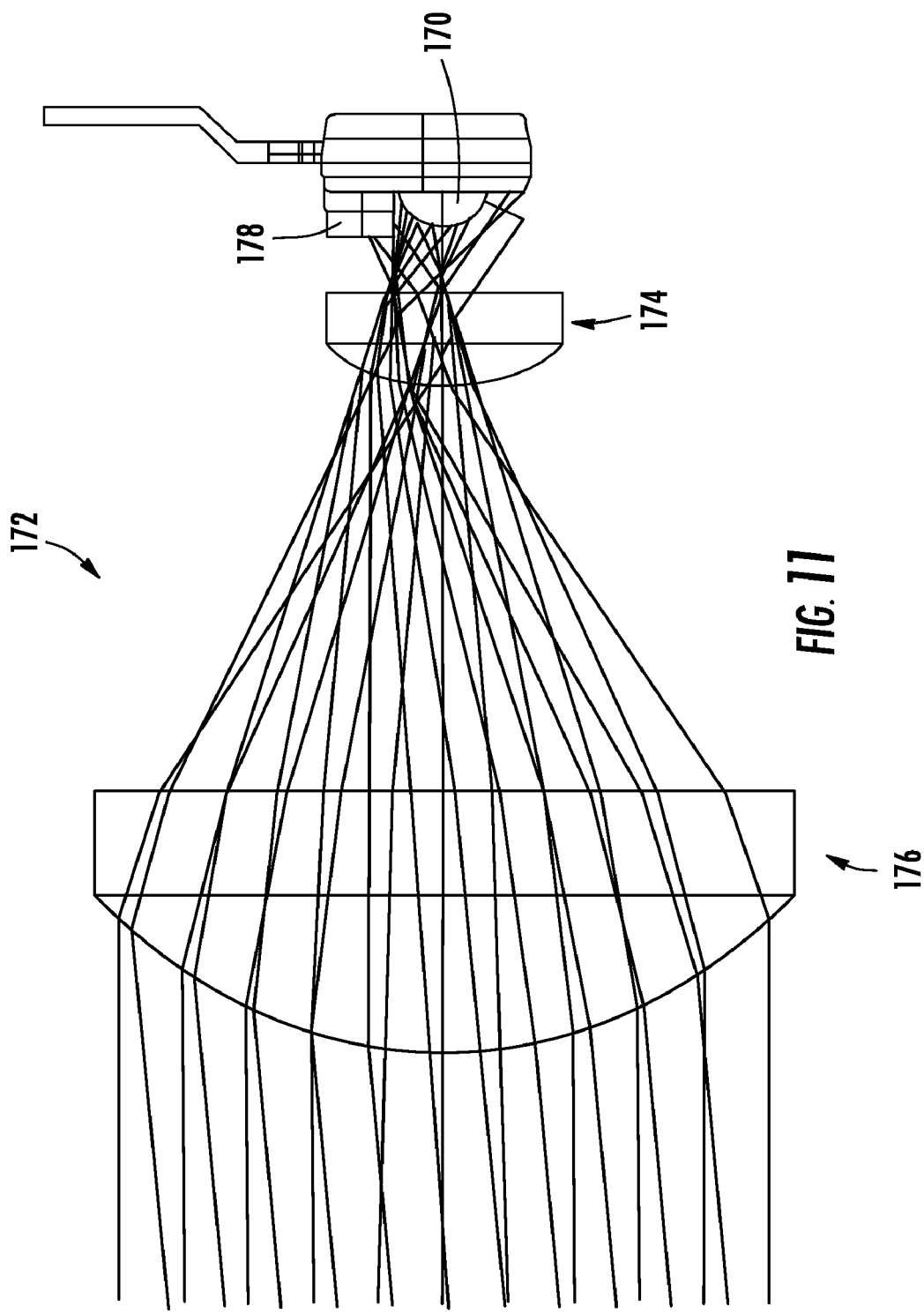
FIG. 11 is a side elevation of a light concentrating system in accordance with the present invention.

Optionally, and with reference to FIG. 11, a photo sensor or light sensitive detector 170 may be placed behind a rearview mirror reflective element in a vehicle, such as in a manner as described above. The detector is used to sense the light produced by headlights of an approaching vehicle, such as a vehicle approaching the subject vehicle from the rear of the subject vehicle. The signal from the detector is then used to darken the mirror to reduce the glare of the reflected image to the driver of the vehicle. However, because the detector is located behind the darkening mirror reflective element, an insufficient amount of energy falls on the detector to provide this control function. To compensate for this reduction of energy, an optical system 172 can be used to increase the amount of energy that falls on the detector 170. The optical system consists of two lenses 174, 176 and a polished aluminum housing 178. The first lens 174 acts as collector lens that gathers light over an extended aperture and focuses it down to the detector. This has the effect of increasing the solid angle of energy collected and delivered to the detector. The second lens 176 acts as a "field" lens to increase the field-of-view collected by the lens assembly. To further increase the efficiency of the assembly, the inside walls of the lens housing 178 are preferably polished to reflect additional light towards the detector and smaller lens. Because the mirror reflective element in the vehicle is typically tilted about 22 degrees towards the driver, the light "amplification" by the optical system is preferably optimized when the front of lens assembly is titled or angled about 22 degrees with respect to the mirror surface. Thus, the optical system is directed or pointed substantially directly rearward towards the approaching headlights of the oncoming vehicle when the mirror reflective element is angled toward the driver of the vehicle.

Optionally, the mirror assembly may include one or more other user actuatable inputs or input devices or human machine interfaces. For example, the inputs or user interfaces may include buttons, such as are described in U.S. Pat. No. 6,501,387, which is hereby incorporated herein by reference, or that include touch/proximity sensors such as are disclosed in U.S. Pat. Nos. 6,001,486; 6,310,611; 6,320,282; and 6,627,918, and U.S. patent application Ser. No. 09/817,874, filed Mar. 26, 2001 by Quist et al. for INTERACTIVE AUTOMOTIVE REARVISION SYSTEM, now U.S. Pat. No. 7,224,324, and PCT Application No. PCT/US03/40611, filed Dec. 19, 2003, which are hereby incorporated herein by reference, or that include other types of buttons or switches, such as those described in U.S. patent application Ser. No. 11/029,695, filed Jan. 5, 2005 by Lindahl et al. for MIRROR ASSEMBLY, now U.S. Pat. No. 7,253,723; and/or U.S. provisional applications, Ser. No. 60/556,259, filed Mar. 25, 2004; Ser. No. 60/553,517, filed Mar. 16, 2004; and Ser. No. 60/535,559, filed Jan. 9, 2004; and/or PCT Application No. PCT/US2004/015424, filed May 18, 2004 by Donnelly Corp. et al. for MIRROR ASSEMBLY FOR VEHICLE, which are hereby incorporated herein by reference, or that include fabric-made position detectors, such as are disclosed in U.S. Pat. Nos. 6,504,531; 6,501,465; 6,492,980; 6,452,479; 6,437,258; and 6,369,804, which are hereby incorporated herein by reference. The manual inputs or user actuatable inputs or actuators may control or adjust or activate/deactivate one or more accessories or elements or features.

Optionally, the interior mirror assembly may comprise a decorative casing to provide a desired appearance to the mirror assembly, such as described in PCT Application No. PCT/US2004/015424, filed May 18, 2004 by Donnelly Corp. et al. for MIRROR ASSEMBLY FOR VEHICLE, which is hereby incorporated herein by reference. For example, the casing may be made by co-injection of different materials in a mold tool to achieve the desired effect. For example, different colors, textures, finish materials and/or the like may be formed from injection into a mold tool or mold cavity of at least two resins (which may be different resin types and/or different resin colors and/or different resin rheological characteristics and/or the like) to provide a finished molded article with the desired color and/or texture and/or surface finish for the mirror casing, such as for its bezel portion and/or its rear or back portion. Similar molding techniques may be used to achieve desired effects on the casing or housing of exterior mirrors and/or windshield electronics modules and/or accessory modules and/or consoles and/or the like, without affecting the scope of the present invention.

The mirror assembly may be mounted at or attached to an interior portion of the vehicle (such as to a mounting button or the like at an interior surface of the vehicle windshield or the like) via any mounting arrangement or assembly or means, such as a single ball or single pivot or single joint mounting arrangement (such as the types described in U.S. Pat. No. 6,483,438 and/or PCT Application No. PCT/US2004/015424, filed May 18, 2004 by Donnelly Corp. et al. for MIRROR ASSEMBLY FOR VEHICLE, which are hereby incorporated herein by reference), or a double ball or double pivot mirror mounting arrangement (such as the types described in commonly assigned U.S. Pat. Nos. 4,646,210 and 6,331,066, which are hereby incorporated herein by reference). Optionally, the mirror mounting components may provide a breakaway type connection or mount, such as the types described in U.S. Pat. Nos. 6,774,810; 6,642,851; 6,483,438; 6,366,213; 6,326,900; 6,222,460; 6,172,613; 6,087,953; 5,820,097; 5,377,949; 5,330,149; and/or 5,100,095, which are all hereby incorporated herein by reference. Optionally, the mirror assembly may incorporate a mounting arrangement of the types described in PCT Application No. PCT/US2003/022196, filed Jul. 17, 2003, published Jan. 29, 2004 as PCT Publication No. WO 2004/009408 A1; and/or PCT Application No. PCT/US2003/021885, filed Jul. 14, 2003, published Jan. 29, 2004 as PCT Publication No. WO 2004/009407 A3; and/or PCT Application No. PCT/US04/015424, filed May 18, 2004 by Donnelly Corp. et al. for MIRROR ASSEMBLY FOR VEHICLE; and/or U.S. patent application Ser. No. 10/933,842, filed Sep. 3, 2004, now U.S. Pat. No. 7,249,860, which are all hereby incorporated by reference herein. Optionally, the mounting arm of the mounting arrangement/assembly may include a passageway therethrough for routing wiring or the like through the arm to provide electrical communication between an electronic circuitry element or printed circuit board or accessory of the mirror assembly and circuitry or accessories or power source of an accessory module or of the vehicle, such as by utilizing principles described in U.S. patent application Ser. No. 10/032,401, filed Dec. 20, 2001, now U.S. Pat. Publication No. US2002/0088916A1, published Jul. 11, 2002, now U.S. Pat. No. 6,877,709; and/or Ser. No. 11/226,628, filed Sep. 14, 2005; and/or PCT Application No. PCT/US2004/015424, filed May 18, 2004 by Donnelly Corp. et al. for MIRROR ASSEMBLY FOR VEHICLE; and/or U.S. provisional applications, Ser. No. 60/642,227, filed Jan. 7, 2005 by Karner et al. for MOUNTING ASSEMBLY FOR MIRROR AND METHOD OF MAKING SAME; Ser. No. 60/638,250, filed Dec. 21, 2004; Ser. No. 60/624,091, filed Nov. 1, 2004, and Ser. No. 60/609,642, filed Sep. 14, 2004, which are all hereby incorporated herein by reference, or may utilize electrical connection principles of the type described in International Publication No. WO 2003/095269 A3, published Nov. 20, 2003 for REARVIEW MIRROR ASSEMBLIES, which is hereby incorporated herein by reference.

Changes and modifications in the specifically described embodiments may be carried out without departing from the principles of the present invention, which is intended to be limited only by the scope of the appended claims, as interpreted according to the principles of patent law.

What is claimed is:

1. A mirror reflective element system for a variable reflectance vehicular mirror, said mirror reflective element system comprising:

a front substrate having a first surface and a second surface, said second surface having a transparent second surface electrically conductive coating disposed thereon;

a rear substrate having a third surface and a fourth surface, said third surface having a third surface electrically conductive coating disposed thereon;

a first electrically conductive element at said fourth surface, said first electrically conductive element being in electrically conductive continuity with said third surface electrically conductive coating;

a second electrically conductive element at said fourth surface, said second electrically conductive element being in electrically conductive continuity with said second surface electrically conductive coating;

a heating element attached to said fourth surface of said rear substrate, said heating element comprising an attaching surface for attaching to said fourth surface and a rear surface opposite said attaching surface, said heating element having an electrically conductive heating element established thereat, said electrically conductive heating element generating heat to heat a portion of said heating element when powered;

said heating element including a first electrically conductive contact element established thereat, said first electrically conductive contact element being at least partially established at said attaching surface;

said heating element including a second electrically conductive contact element established thereat, said second electrically conductive contact element being at least partially established at said attaching surface;

said electrically conductive heating element and said first and second electrically conductive contact elements being electrically isolated from one another;

said first electrically conductive contact element connecting to said first electrically conductive element at said fourth surface of said rear substrate such that electrically conductive continuity is established between said first electrically conductive contact element and said first electrically conductive element when said heating element is attached to said fourth surface; and said second electrically conductive contact element connecting to said second electrically conductive element at said fourth surface of said rear substrate such that electrically conductive continuity is established between said second electrically conductive contact element and said second electrically conductive element when said heating element is attached to said fourth surface.

2. The mirror reflective element system of claim 1, wherein said first and second electrically conductive elements and said electrically conductive heating element are accessible at said rear surface of said heating element.

3. The mirror reflective element system of claim 1, wherein said first and second electrically conductive elements comprise conductive coatings that are coated over a respective edge portion of said rear substrate.

4. The mirror reflective element system of claim 3, wherein a portion of said third surface electrically conductive coating is coated at least partially over a first edge portion of said rear substrate.

5. The mirror reflective element system of claim 4, wherein said first electrically conductive element and said portion of said third surface electrically conductive coating at least partially overlap at said first edge portion of said rear substrate.

6. The mirror reflective element system of claim 5, wherein an electrically conductive medium is disposed at a second edge region of said reflective element to establish electrically conductive continuity between said second electrically conductive element and said second surface electrically conductive coating at said second surface of said front substrate.

7. The mirror reflective element system of claim 1, wherein said first and second electrically conductive contact elements comprise terminal connectors for electrically conductively connecting to a wiring harness of said mirror assembly.

8. A mirror reflective element system for a variable reflectance vehicular mirror, said mirror reflective element system comprising:

a front substrate having a first surface and a second surface, said second surface having a transparent second surface electrically conductive coating disposed thereon;

a rear substrate having a third surface and a fourth surface, said third surface having a third surface electrically conductive coating disposed thereon;

a first electrically conductive element at said fourth surface, said first electrically conductive element being in electrically conductive continuity with said third surface electrically conductive coating;

a second electrically conductive element at said fourth surface, said second electrically conductive element being in electrically conductive continuity with said second surface electrically conductive coating;

a heating element attached to said fourth surface of said rear substrate, said heating element comprising an attaching surface for attaching to said fourth surface and a rear surface opposite said attaching surface, said heating element having an electrically conductive heating element established thereat, said electrically conductive heating element generating heat to heat a portion of said heating element when powered;

said heating element including a first electrically conductive contact element established thereat, said first electrically conductive contact element being at least partially established at said attaching surface;

said heating element including a second electrically conductive contact element established thereat, said second electrically conductive contact element being at least partially established at said attaching surface;

said electrically conductive heating element and said first and second electrically conductive contact elements being electrically isolated from one another;

said first electrically conductive contact element electrically conductively connecting to said first electrically conductive element such that electrically conductive continuity is established between said first electrically conductive contact element and said first electrically conductive element when said heating element is attached to said fourth surface; and said second electrically conductive contact element electrically conductively connecting to said second electrically conductive element such that electrically conductive continuity is established between said second electrically conductive contact element and said second electrically conductive element when said heating element is attached to said fourth surface.

9. The mirror reflective element system of claim 8, wherein said first and second electrically conductive elements and said electrically conductive heating element are accessible at said rear surface of said heating element.

10. The mirror reflective element system of claim 8, wherein said first and second electrically conductive elements comprise conductive coatings that are coated over a respective edge portion of said rear substrate.

11. The mirror reflective element system of claim 10, wherein a portion of said third surface electrically conductive coating is coated at least partially over a first edge portion of said rear substrate.

12. The mirror reflective element system of claim 11, wherein said first electrically conductive element and said portion of said third surface electrically conductive coating at least partially overlap at said first edge portion of said rear substrate.

13. The mirror reflective element system of claim 12, wherein an electrically conductive medium is disposed at a second edge region of said reflective element to establish electrically conductive continuity between said second electrically conductive element and said second surface electrically conductive coating at said second surface of said front substrate.

14. The mirror reflective element system of claim 8, wherein said first and second electrically conductive contact elements comprise terminal connectors for electrically conductively connecting to a wiring harness of said mirror assembly.

15. A mirror reflective element system for a variable reflectance vehicular mirror, said mirror reflective element system comprising:

a front substrate having a first surface and a second surface, said second surface having a transparent second surface electrically conductive coating disposed thereon;

a rear substrate having a third surface and a fourth surface, said third surface having a third surface electrically conductive coating disposed thereon;

a first electrically conductive element at said fourth surface, said first electrically conductive element being in electrically conductive continuity with said third surface electrically conductive coating, wherein said first electrically conductive element comprises an electrically conductive coating disposed at least partially at said fourth surface;

a second electrically conductive element at said fourth surface, said second electrically conductive element being in electrically conductive continuity with said second surface electrically conductive coating, wherein said second electrically conductive element comprises an electrically conductive coating disposed at least partially at said fourth surface;

a heating element attached to said fourth surface of said rear substrate, said heating element comprising an attaching surface for attaching to said fourth surface and a rear surface opposite said attaching surface, said heating element having an electrically conductive heating element established thereat, said electrically conductive heating element generating heat to heat a portion of said heating element when powered;

said heating element including a first electrically conductive contact element established thereat, said first electrically conductive contact element being at least partially established at said attaching surface;

said heating element including a second electrically conductive contact element established thereat, said second electrically conductive contact element being at least partially established at said attaching surface;

said electrically conductive heating element and said first and second electrically conductive contact elements being electrically isolated from one another;

said first electrically conductive contact element electrically conductively connecting to said first electrically conductive element such that electrically conductive continuity is established between said first electrically conductive contact element and said first electrically conductive element when said heating element is attached to said fourth surface; and said second electrically conductive contact element electrically conductively connecting to said second electrically conductive element such that electrically conductive continuity is established between said second electrically conductive contact element and said second electrically conductive element when said heating element is attached to said fourth surface.

16. The mirror reflective element system of claim 15, wherein said first and second electrically conductive elements and said electrically conductive heating element are accessible at said rear surface of said heating element.

17. The mirror reflective element system of claim 15, wherein said first and second electrically conductive elements are coated at least partially over a respective edge portion of said rear substrate.

18. The mirror reflective element system of claim 17, wherein a portion of said third surface electrically conductive coating is coated at least partially over a first edge portion of said rear substrate.

19. The mirror reflective element system of claim 18, wherein said first electrically conductive element and said portion of said third surface electrically conductive coating at least partially overlap at said first edge portion of said rear substrate.

20. The mirror reflective element system of claim 19, wherein an electrically conductive medium is disposed at a second edge region of said reflective element to establish electrically conductive continuity between said second electrically conductive element and said second surface electrically conductive coating at said second surface of said front substrate.

21. The mirror reflective element system of claim 15, wherein said first and second electrically conductive contact elements comprise terminal connectors for electrically conductively connecting to a wiring harness of said mirror assembly.

* * * * *

UNITED STATES PATENT AND TRADEMARK OFFICE
CERTIFICATE OF CORRECTION

PATENT NO. : 7,800,019 B2  
APPLICATION NO. : 12/578729  
DATED : September 21, 2010  
INVENTOR(S) : Donald C. Byers et al.

Page 1 of 1

It is certified that error appears in the above-identified patent and that said Letters Patent is hereby corrected as shown below:

Column 1
Line 58, "element)," should be --element).--

Column 4
Line 53, "Lainpert" should be --Lampert--

Column 21
Line 49, "1.2 inn" should be --1.2 mm--

Column 28
Line 54, "Whereby" should be --whereby--

Column 33
Line 21, "flow" should be --now--

Column 37
Line 29, "minor" should be --mirror--

Signed and Sealed this  
Twenty-second Day of November, 2011

David J. Kappos  
*Director of the United States Patent and Trademark Office*